Figure 1:
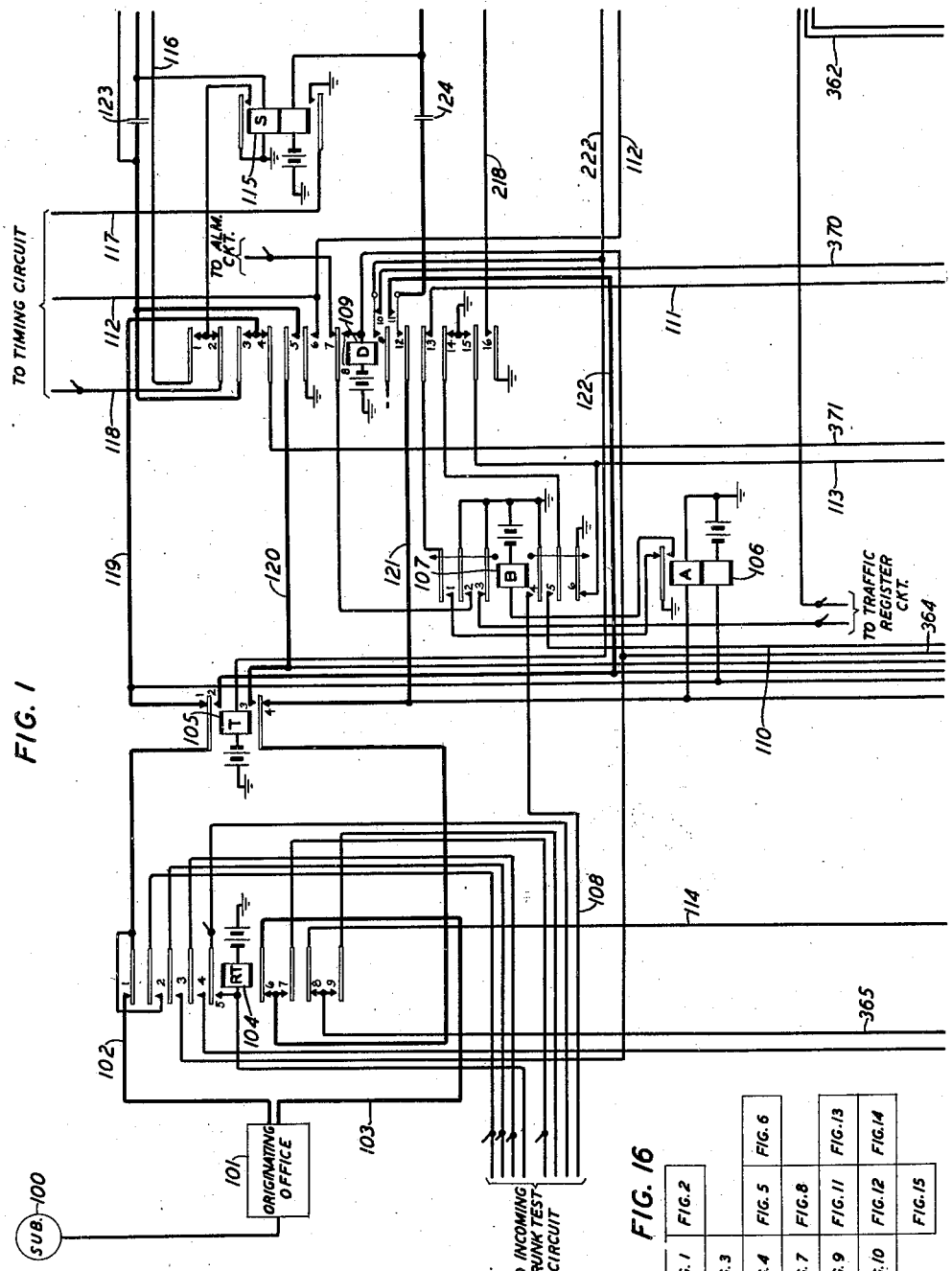

Dec. 13, 1949        A. E. JOEL, JR        2,491,377

CONNECTOR CONTROL SYSTEM

Filed Dec. 31, 1946        15 Sheets-Sheet 2

INVENTOR
A. E. JOEL, JR.
BY
C. Mathis

ATTORNEY

Dec. 13, 1949     A. E. JOEL, JR     2,491,377
CONNECTOR CONTROL SYSTEM
Filed Dec. 31, 1946     15 Sheets-Sheet 8

INVENTOR
A. E. JOEL, JR.
BY C. Mattice
ATTORNEY

Dec. 13, 1949  A. E. JOEL, JR  2,491,377
CONNECTOR CONTROL SYSTEM
Filed Dec. 31, 1946  15 Sheets-Sheet 13

INVENTOR
A. E. JOEL, JR.
BY
C. Mathis
ATTORNEY

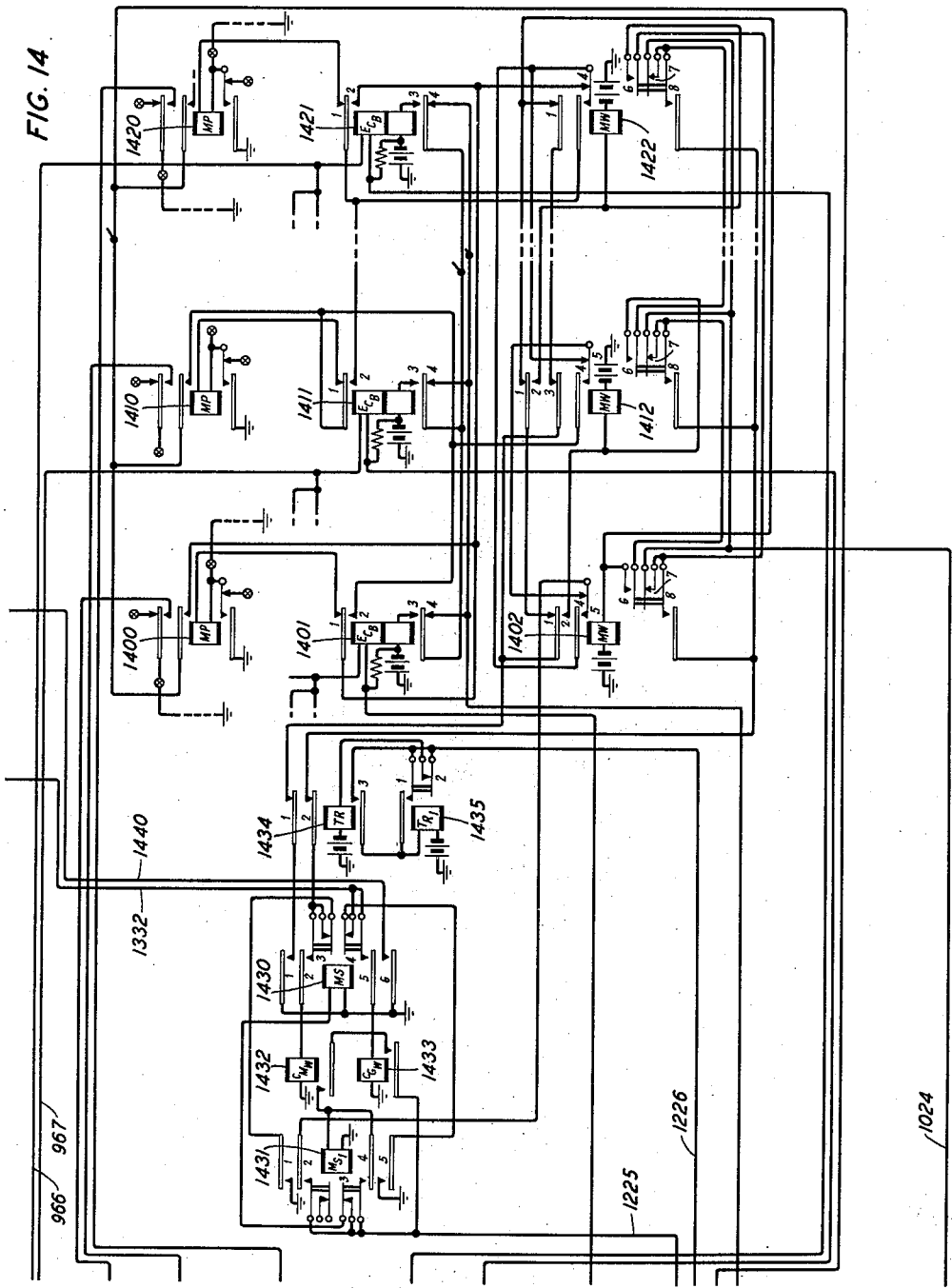

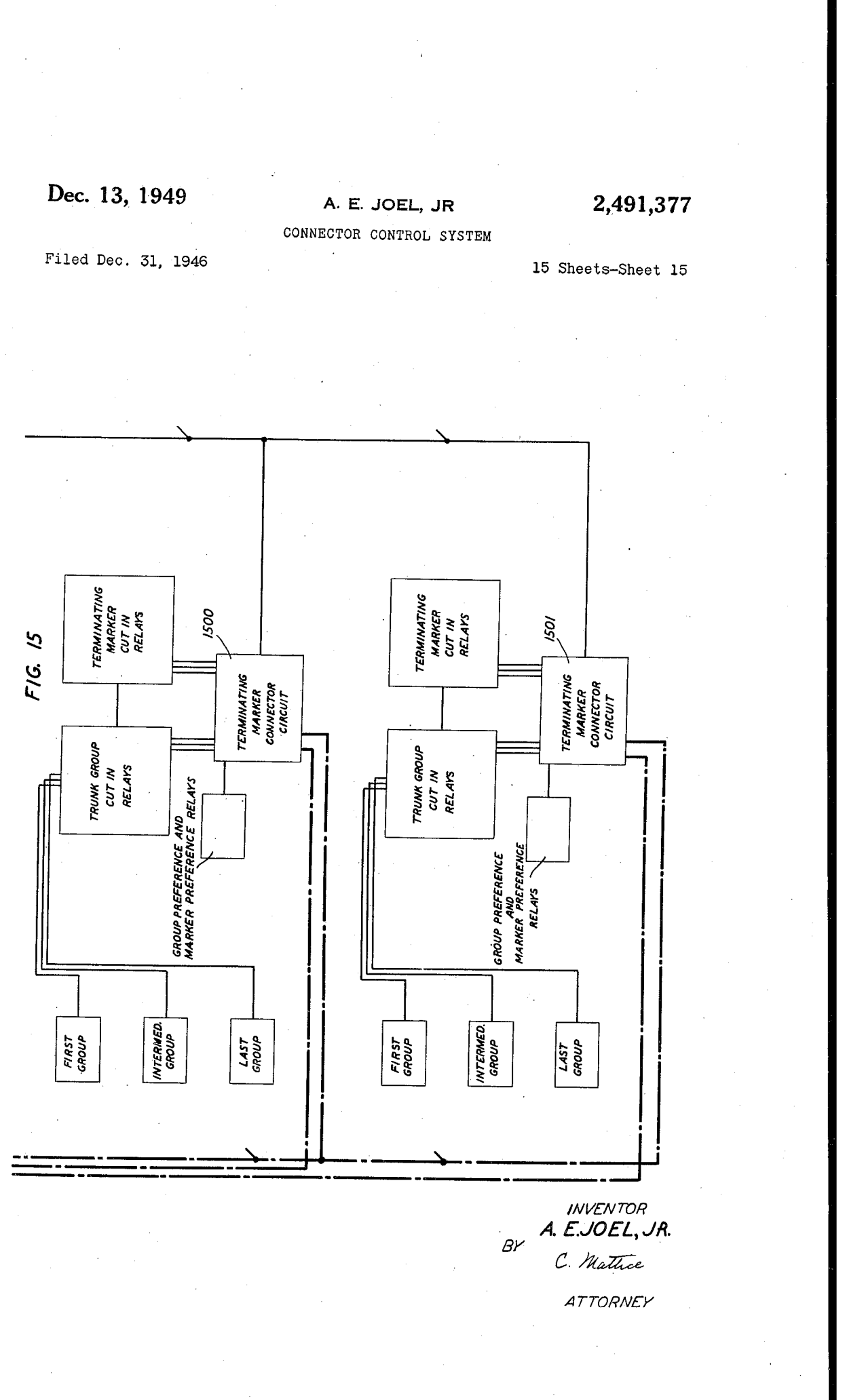

Dec. 13, 1949     A. E. JOEL, JR     2,491,377
CONNECTOR CONTROL SYSTEM

Filed Dec. 31, 1946     15 Sheets-Sheet 15

INVENTOR
A. E. JOEL, JR.
BY
C. Mattice
ATTORNEY

Patented Dec. 13, 1949

2,491,377

UNITED STATES PATENT OFFICE 2,491,377

CONNECTOR CONTROL SYSTEM

Amos E. Joel, Jr., New York, N. Y., assignor to Bell Telephone Laboratories, Incorporated, New York, N. Y., a corporation of New York Application December 31, 1946, Serial No. 719,354

18 Claims. (Cl. 179—18)

This invention relates to telephone systems and more particularly to systems employing common control circuits for operating automatic switches to extend telephone connections.

When interoffice calls are to be completed by such equipment, it has heretofore been customary to first connect an incoming trunk with one of a plurality of registering devices and then connect that registering device with one of a plurality of switch control circuits.

In accordance with the present invention, means is provided for connecting an incoming trunk directly with a switch control circuit.

Since such an arrangement requires the connection of any one of a large number of trunk circuits with a comparatively small number of control circuits the trunks are arranged in groups, each having an individual connector, and subgroups each having a connecting element in one connector, while the control circuits or markers have individual connecting elements in each connector.

More specifically, each connector comprises a plurality of multicontact relays, one for each trunk subgroup and one for each control circuit with a series of preference relays for the trunk groups and a series of preference relays for the control circuits which determine the order in which the trunk subgroups may be served and the order in which the control circuits are available.

In accordance with a feature of the invention a set of auxiliary preference relays is provided for the trunk subgroups and for the control circuits with means for substituting these auxiliary preference relays for the regular preference relays in any connector or in the various connectors in rotation.

In addition, means is provided in connection with the auxiliary preference relays to advance the preference with each use.

Figure 2:
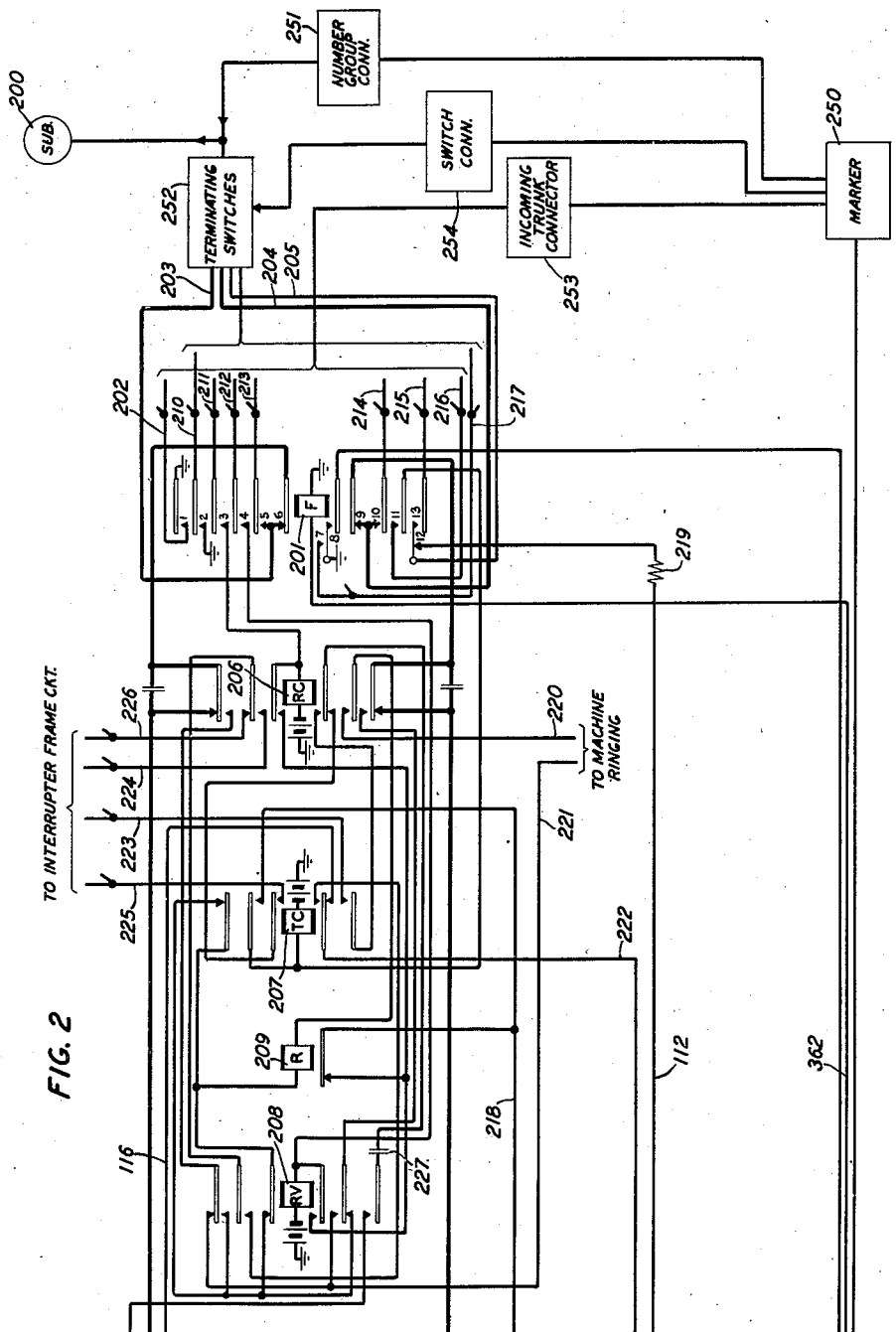
Figure 3:
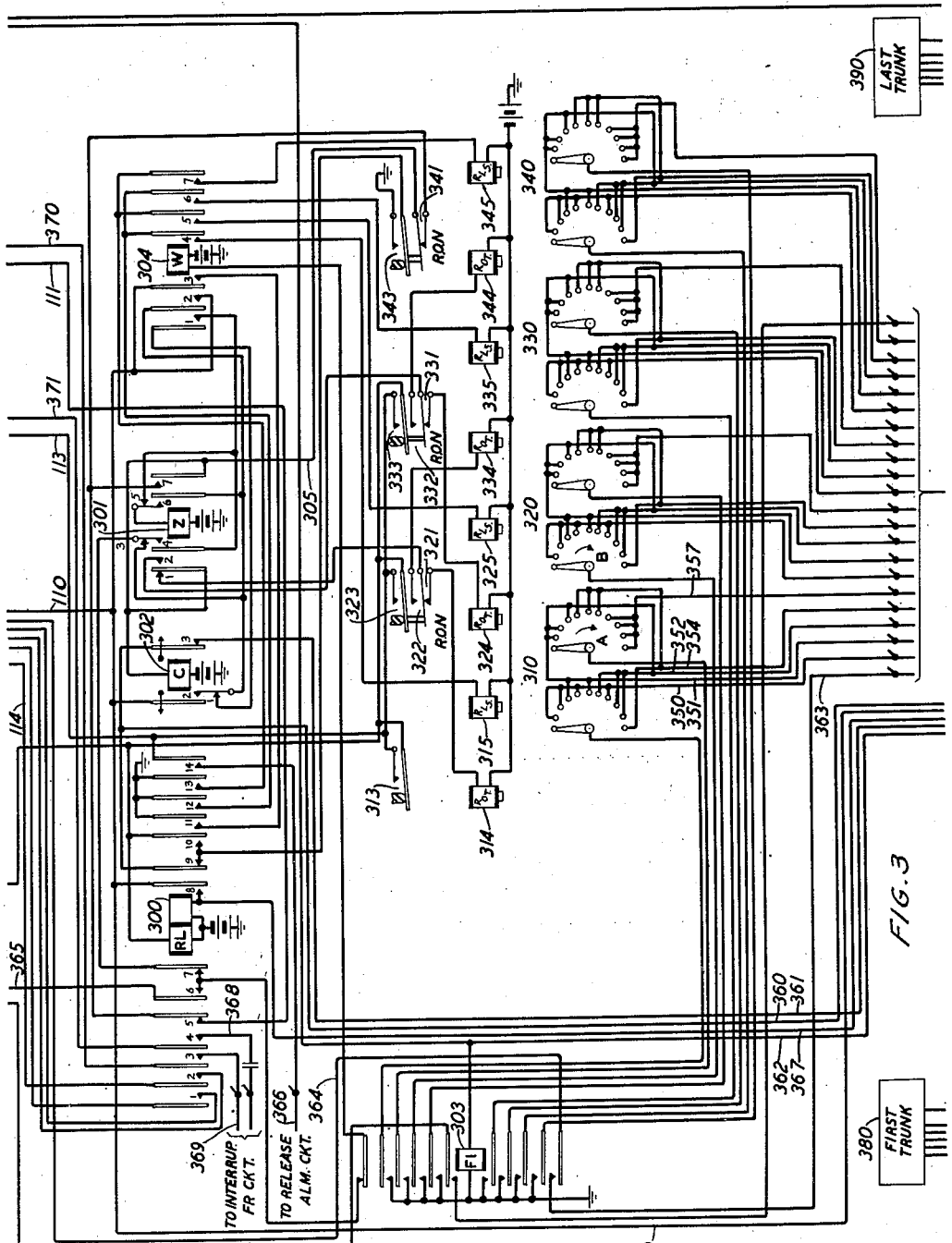
Figure 4:
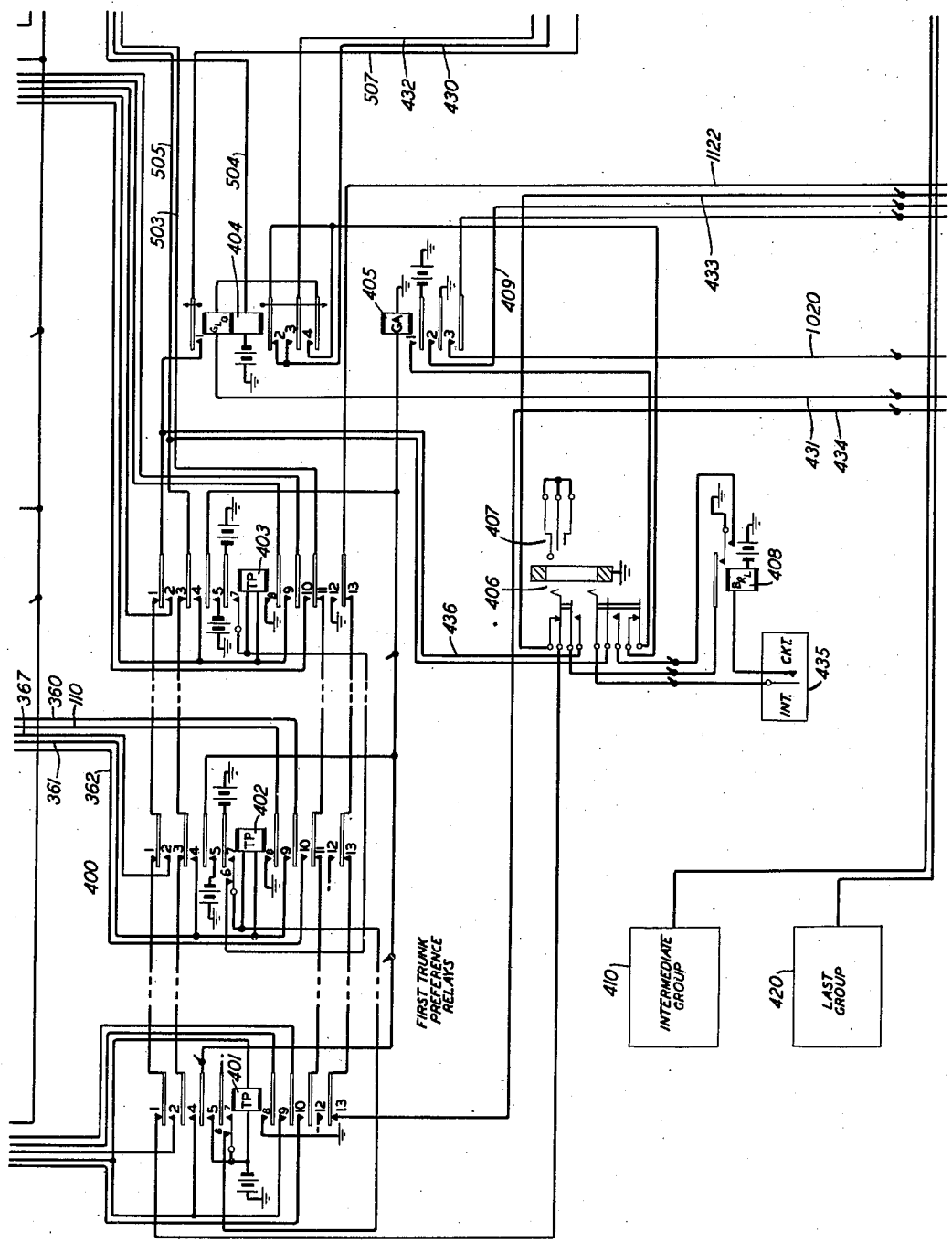
Figure 5:
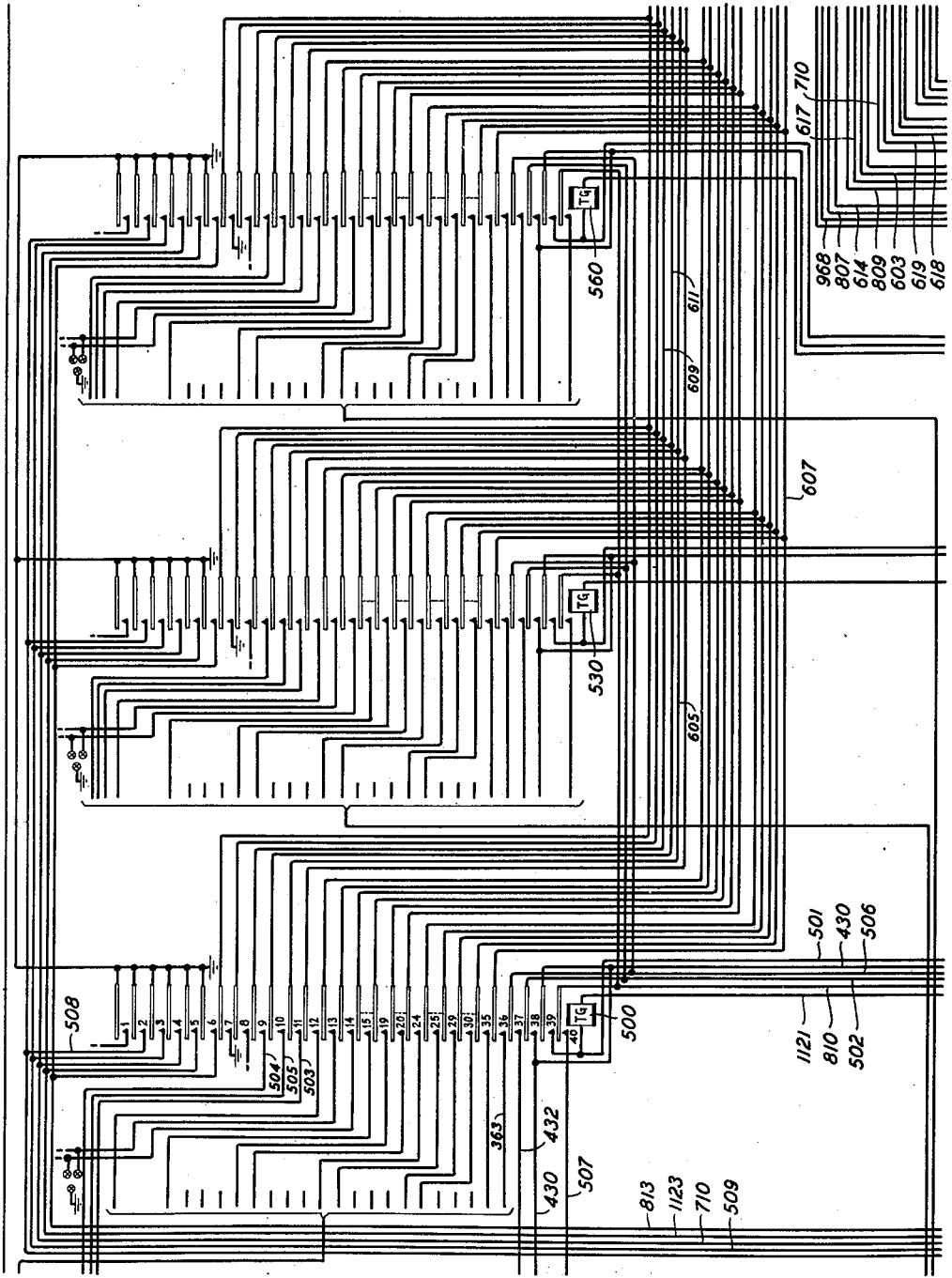
Figure 6:
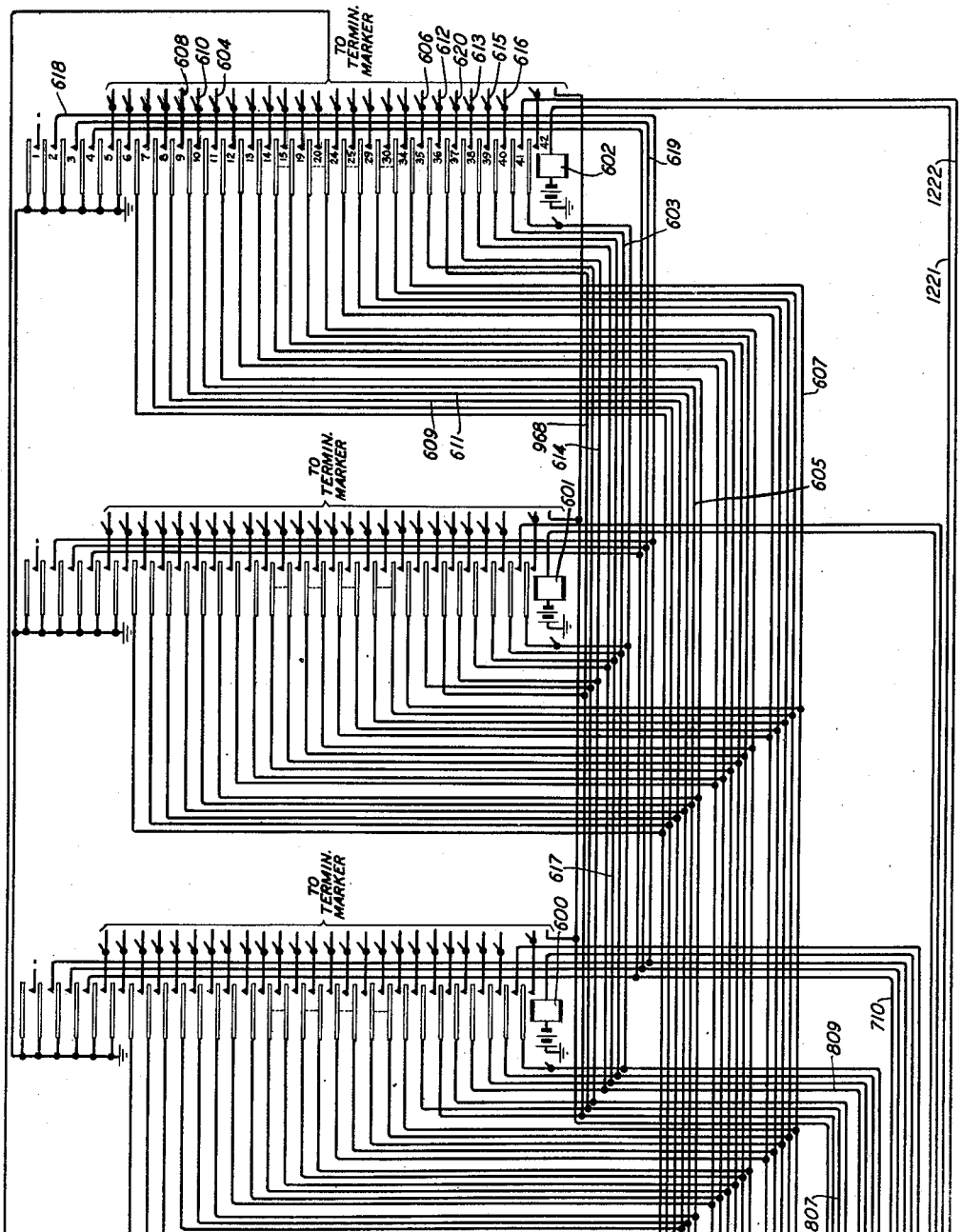
Figure 7:
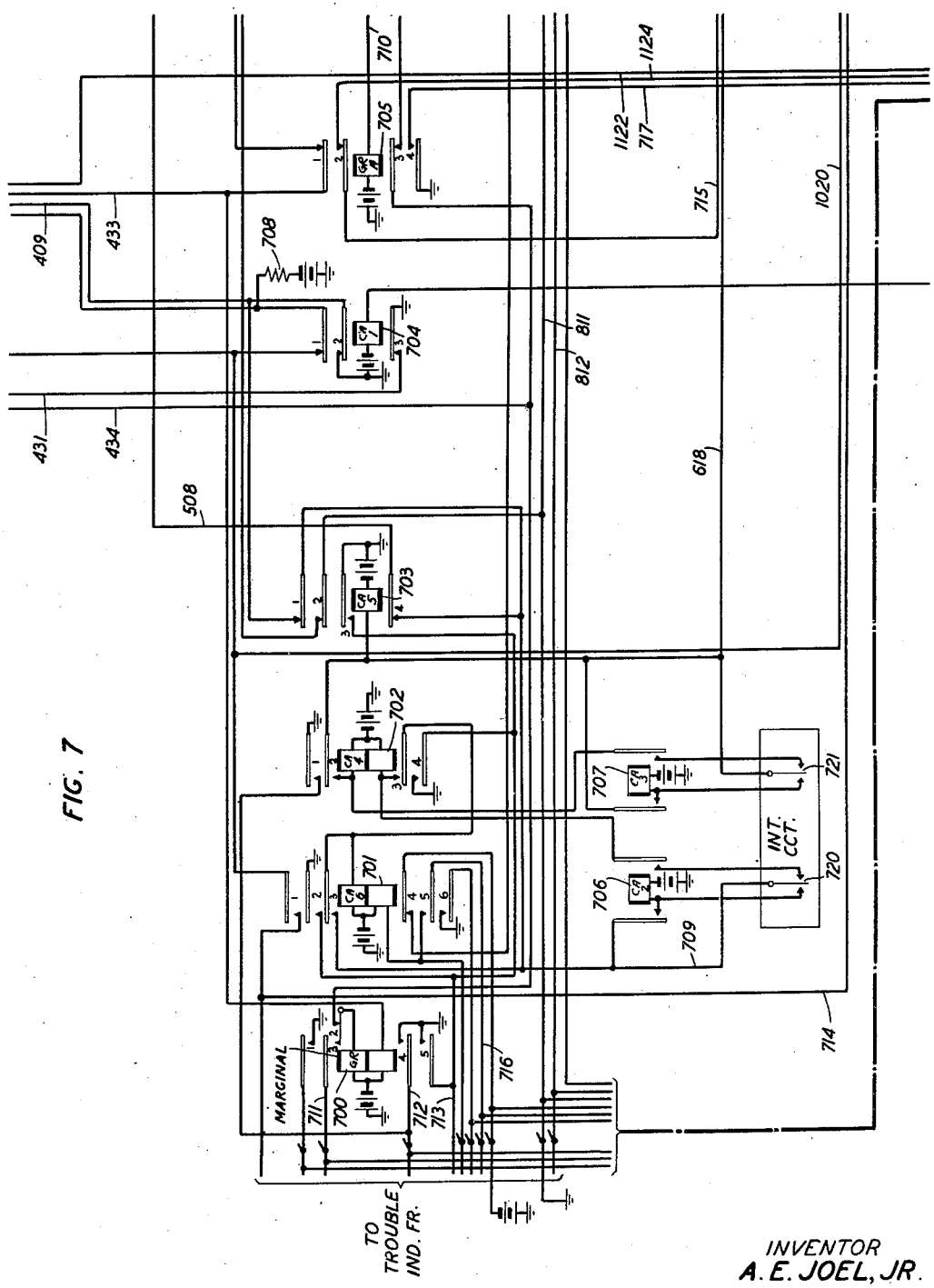
Figure 8:
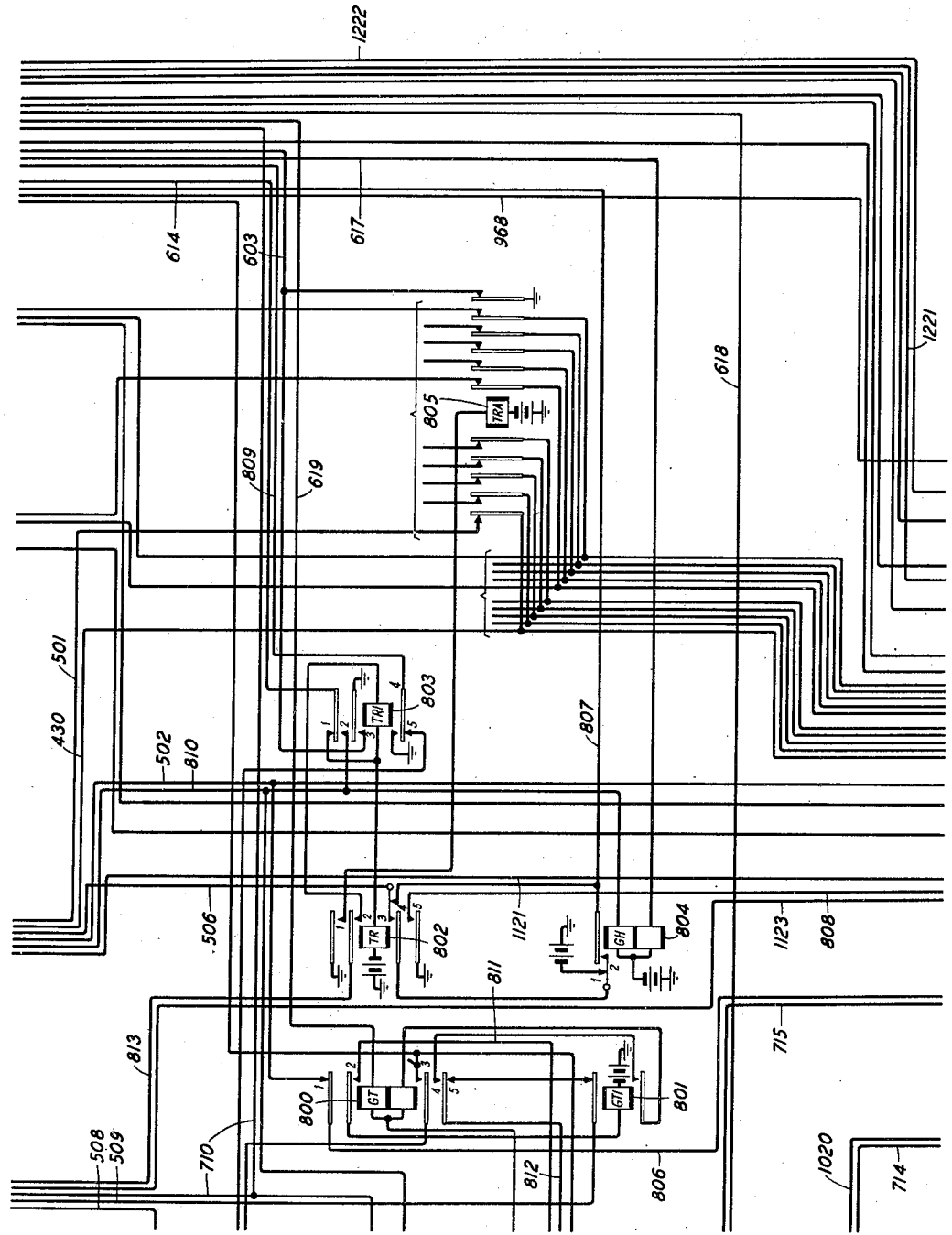
Figure 9:
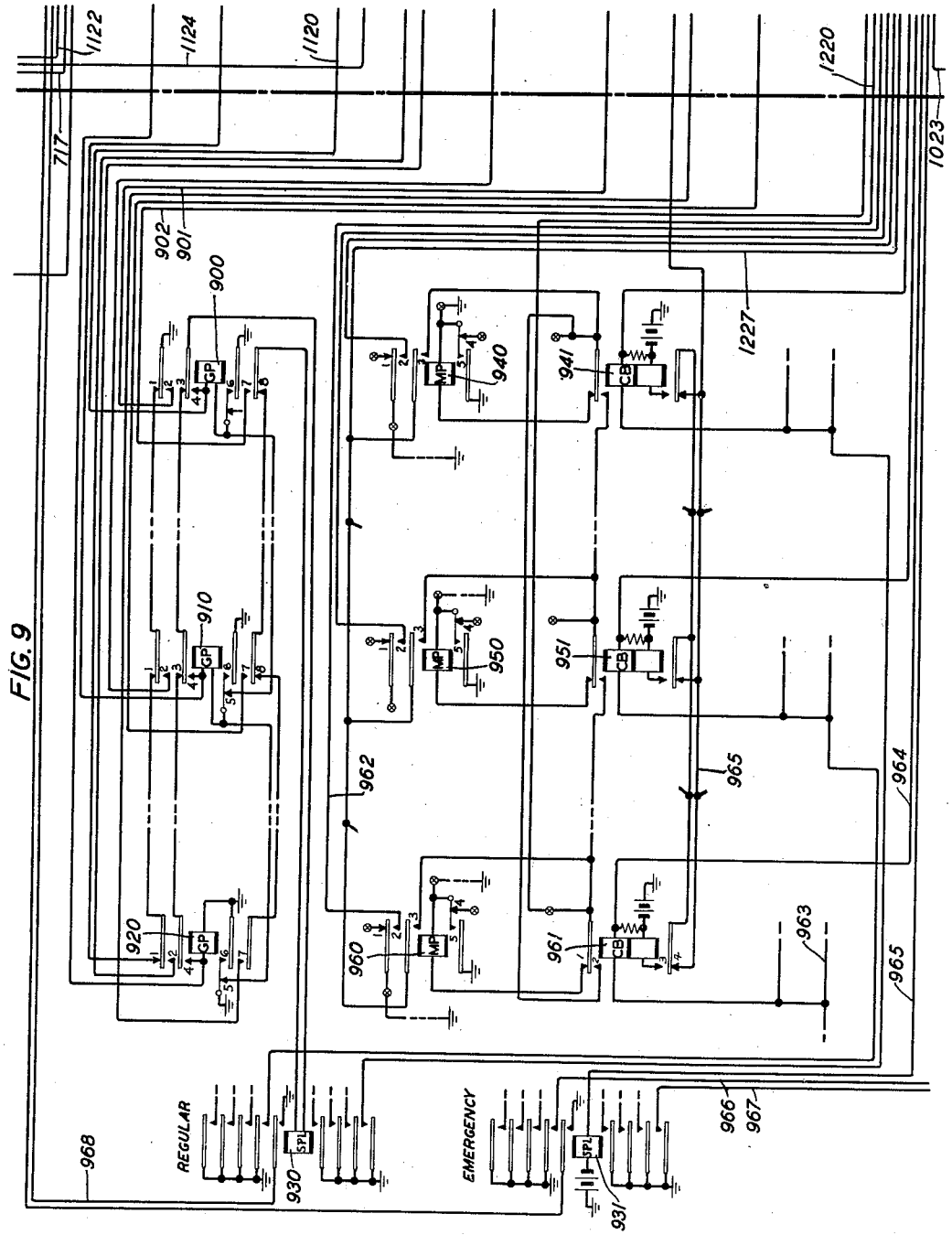
Figure 10:
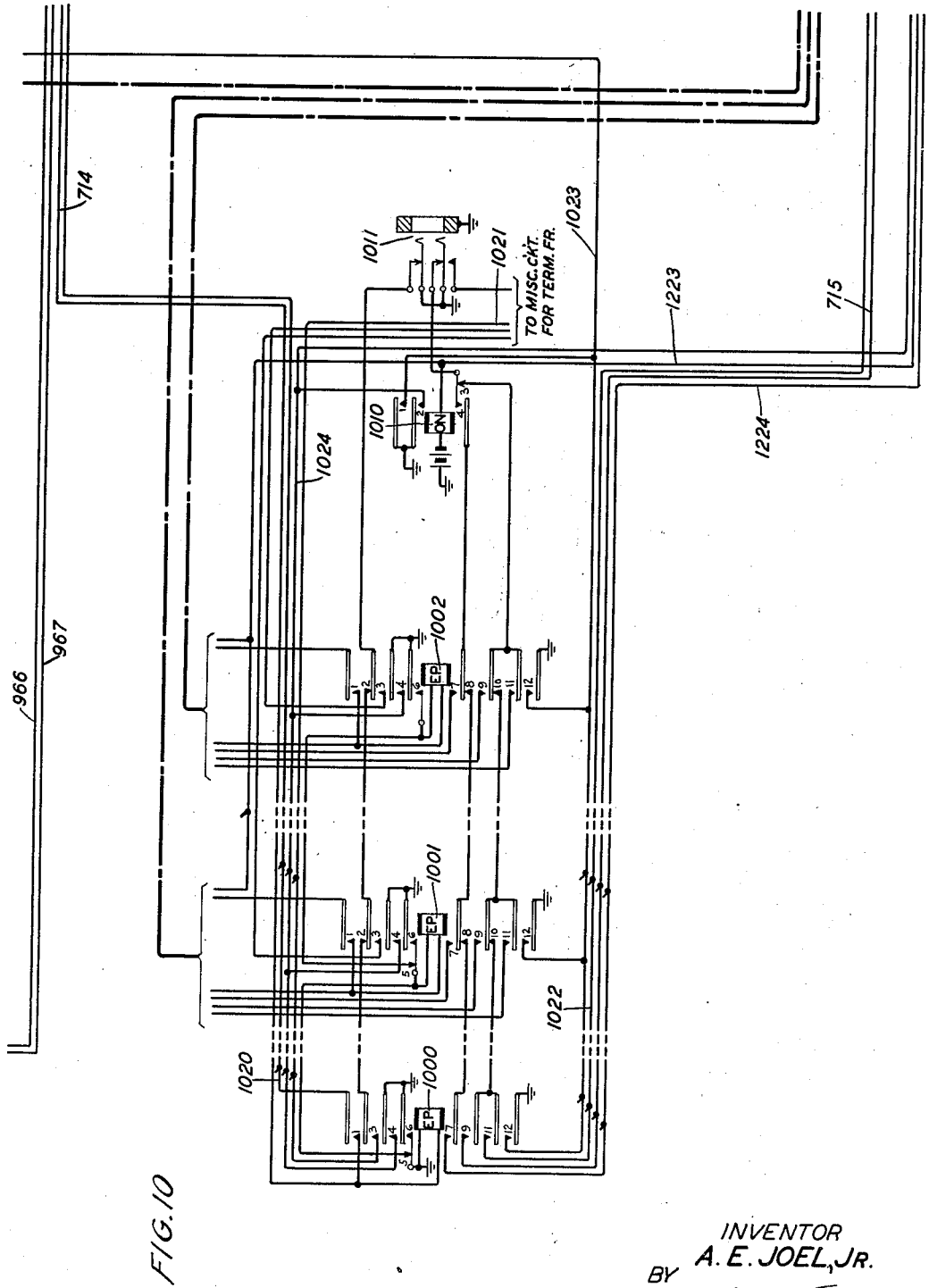
Figure 11:
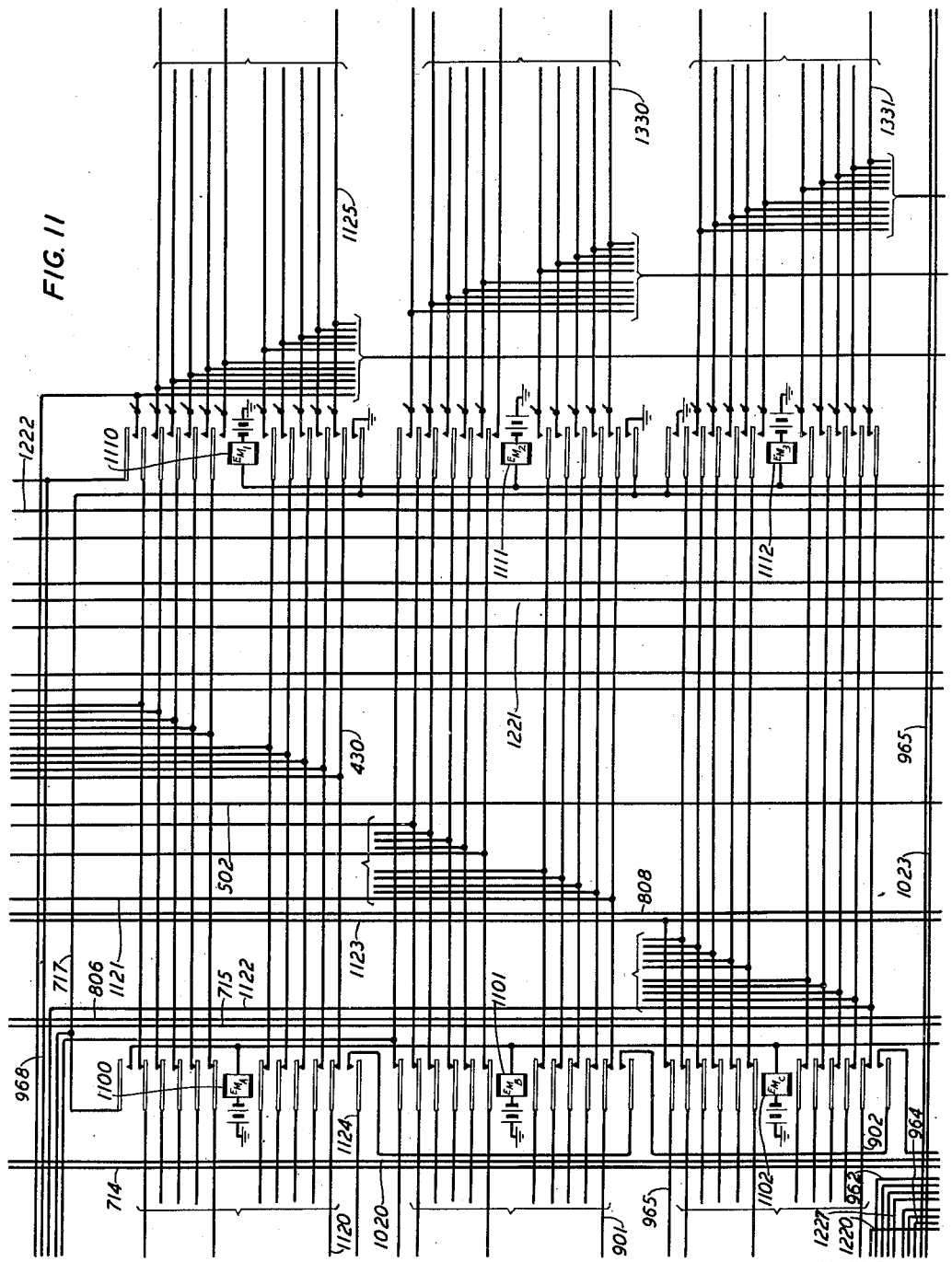
Figure 12:
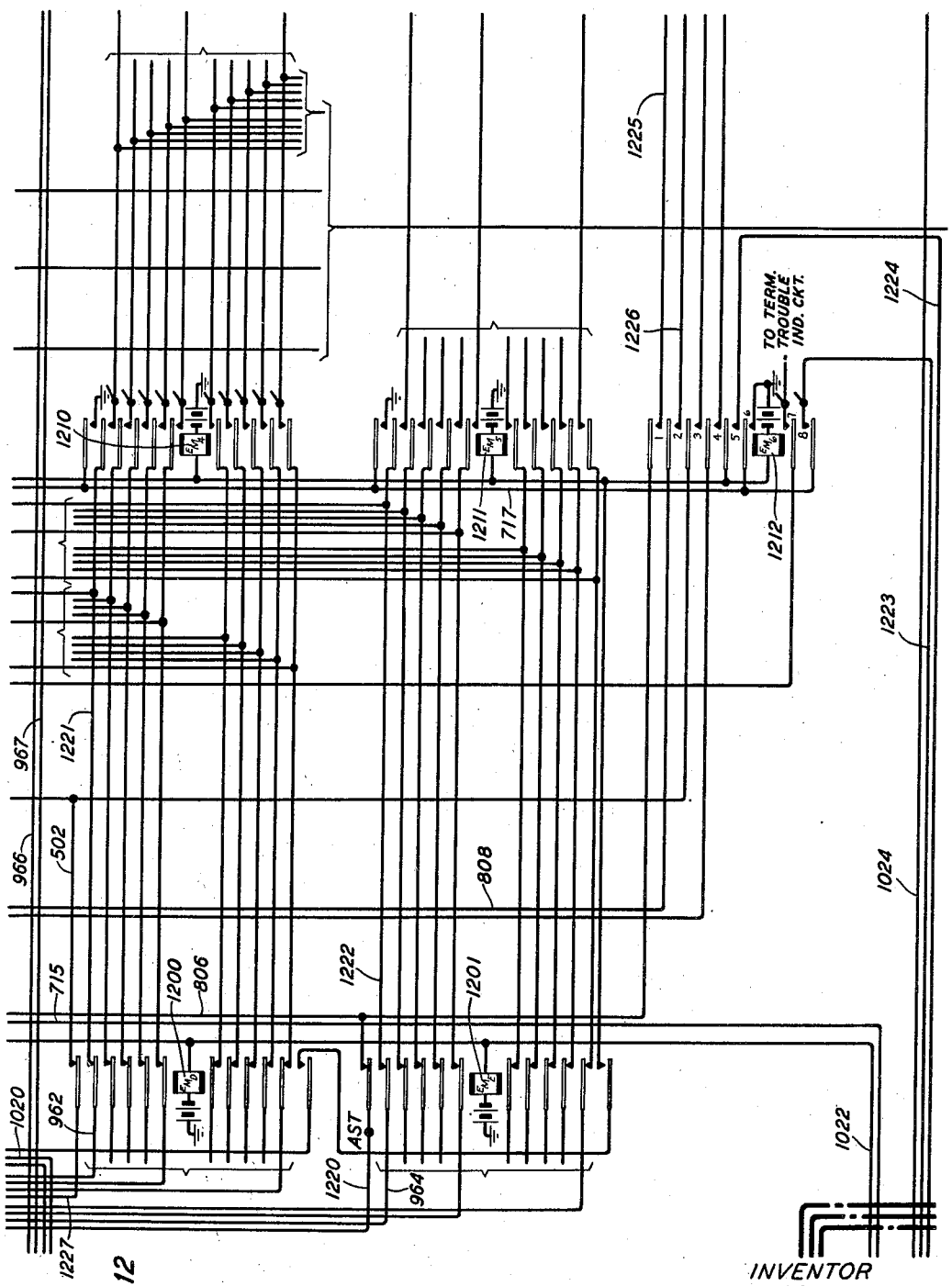
Figure 13:
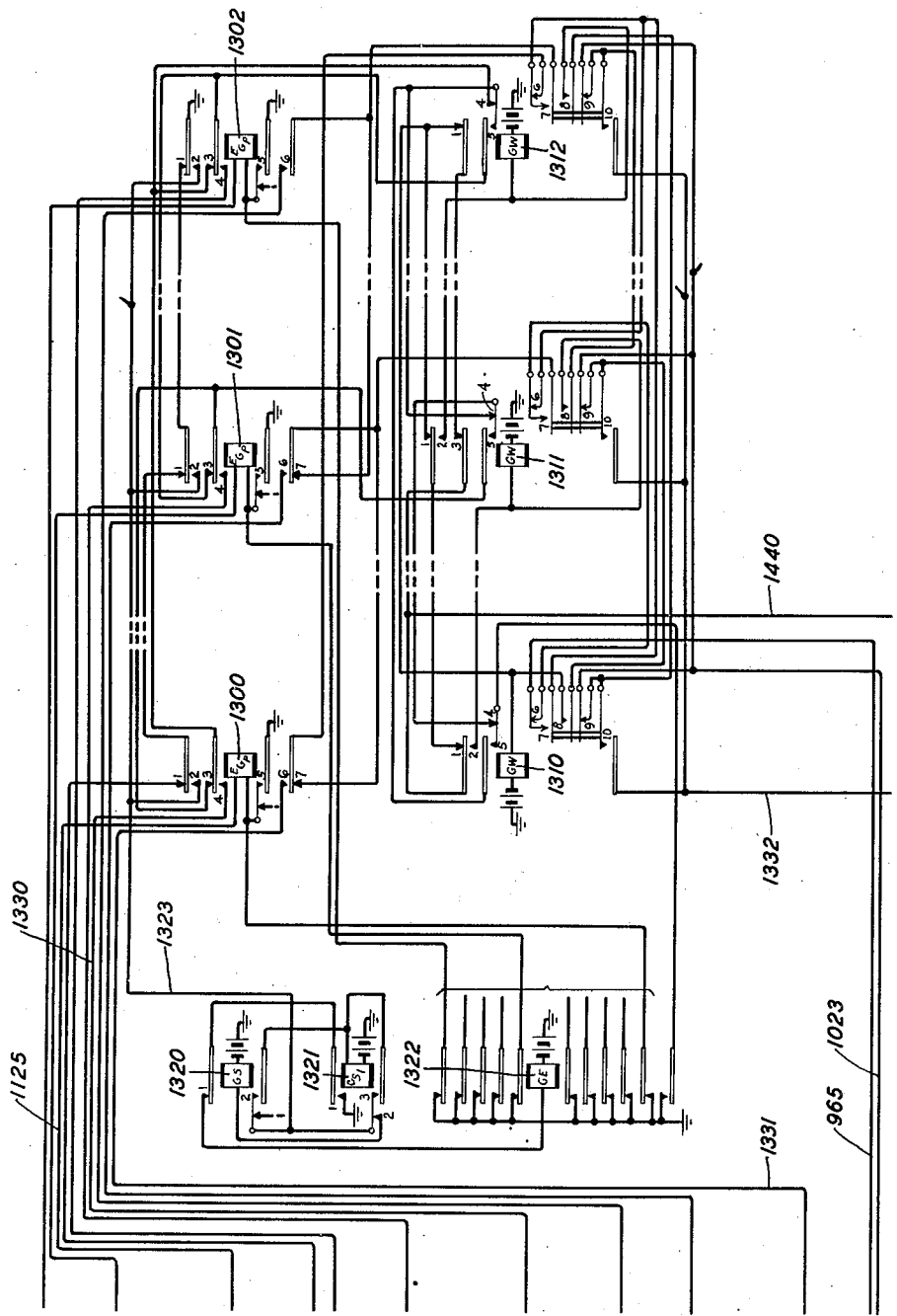

These and other features of the invention will be more clearly understood from a consideration of the following description read in connection with the drawing in which:

Figs. 1 to 3, inclusive, show an incoming trunk circuit;

Figs. 4 to 15 show the connector arrangement;

Fig. 4 showing the trunk preference relays;

Fig. 5 showing the trunk group multicontact relays;

Fig. 6 showing the marker multicontact relays;

Figs. 7 and 8 showing certain connector control circuits;

Fig. 9 showing the regular trunk group and marker preference relays;

Fig. 10 showing the connector preference relays;

Figs. 11 and 12 showing the emergency disconnect and cut-in relays;

Fig. 13 showing the auxiliary trunk group preference relays;

Fig. 14 showing the auxiliary marker preference relays;

Fig. 15 showing additional connectors; and

Fig. 16 shows the arrangement of Figs. 1 to 15, inclusive.

The trunk circuit of Figs. 1 to 3 is disclosed in applicant's copending application, Serial No. 717,519, filed December 20, 1946, issued U. S. Patent No. 2,465,539, March 29, 1949.

Briefly, the operation of the circuit is as follows: After a call is extended to a trunk, the wanted line number is registered on registers individual to the trunk. When the last digit has been registered, the trunk operates the associated relay in the trunk preference chain of Fig. 4, where it competes with other trunks of the same group, operating a group relay. The group relay operates the relay associated with its trunk group in the preference chain at the top of Fig. 9 competing with other trunk groups appearing in this connector. When a trunk group preference relay becomes effective the multicontact trunk group relay is operated and a circuit prepared for operating a marker preference relay in the preference chain at the bottom of Fig. 9, where this connector competes with other connectors for an idle marker. The operation of a marker preference relay seizes the associated marker for this connector and operates the marker multicontact relay. With the trunk group and marker multicontact relays operated the registration transfer circuits are extended from the marker to the trunk group and a relay individual to the calling trunk is operated to transfer the registration to the marker.

If there is undue delay in reaching a marker, the connector operates a relay in the connector preference chain of Fig. 10 where it competes with other connectors for the use of the auxiliary trunk group and marker preference relays of Figs. 13 and 14. When a connector preference relay becomes effective it disconnects the regular trunk group and marker preference relays and connects with the auxiliary preference relays which function with the associated connector to establish trunk-marker connections therein. Associated with the auxiliary preference relays are sets of preference advance relays which are operated to advance the initial preference after each use.

Detailed operation

When the subscriber substation 100 originates a call, his line is associated with equipment at the originating office indicated at 101 which responds to the dialing of the digits representing the office at which the wanted line is located, to extend the line to a trunk outgoing to that office. Assuming that the trunk of Figs. 1 and 2 has been selected, a circuit is thereupon completed from battery through the lower winding of relay 106, conductor 119, contact 1 of relay 105, contact 1 of relay 104, tip conductor 102 to the originating office and the dialing bridge supplied thereat either by the office equipment or the calling line, ring conductor 103, contact 6 of relay 104, contact 4 of relay 105, conductor 121, to ground through the upper winding of relay 106.

Relay 106 operates in this circuit, closing an obvious circuit for relay 107 which also operates. When the first digit of the wanted number is dialed, relay 106 releases at each opening of its circuit, opening the circuit of relay 107. However, relay 107, being slow to release, remains operated throughout the dialing of the various digits. At its back contact, relay 106 completes a pulsing circuit leading to the register circuit of Fig. 3, which may be traced from ground at the back contact of relay 106, contact 1 of relay 107, contact 13 of relay 109, conductor 111, contact 5 of relay 300, normal contact 341 of register 340, conductor 305, winding of relay 302 and battery, and in parallel with relay 302 over contact 1 of relay 301, normal contact 321 of register 320 to the winding of magnet 314 and battery.

Relay 302 operates in response to the first pulse and, being slow to release remains operated until the end of the digit. Magnet 314 responds to each pulse and advances register 310 to a position corresponding to the digit dialed. When register 310 advances from normal it closes off-normal contact 313.

With relay 302 operated, a circuit is closed from battery through the winding of relay 304, back contact of relay 303, contact 7 of relay 300, contact 3 of relay 301, contact 2 of relay 302, contact 5 of relay 107, and contact 14 of relay 109 to ground over conductor 110. Relay 304 operates in this circuit closing a locking circuit for itself extending as above traced to contact 3 of relay 301 and thence over contact 2 of relay 304 to ground on conductor 110.

After the end of the digit, relay 106 remains operated long enough for relay 302 to release and close a circuit from battery through the winding of relay 301, contact 5 of relay 301, contact 1 of relay 304, contact 1 of relay 302, contact 2 of relay 304 to ground on conductor 110. Relay 301 operates in this circuit, closing a locking circuit for itself over its contact 6, contact 2 of relay 304 to conductor 110. At its make-before-break contacts 3 and 4, relay 301 closes an alternate holding circuit for relay 304 and then opens the previously traced holding circuit for that relay. This alternate holding circuit extends over the path traced for the original holding circuit to the make-before-break contact of relay 301, over the make contact 4, contact 1 of relay 304, contact 1 of relay 302, contact 2 of relay 304 to ground on conductor 110. Therefore, both relays 301 and 304 are operated at the beginning of the second digit.

The first pulse of the second digit causes the operation of relay 302 as before, but the pulsing circuit now extends from conductor 305 over contact 2 of relay 301, normal contact 331 of register 330, winding of magnet 324 to battery so that register 320 is positioned in accordance with the second digit, opening normal contact 321 and closing off-normal contacts 322 and 323.

As soon as relay 302 operates at the beginning of the second digit, the alternate holding circuit for relay 304 is opened and that relay releases. However, a holding circuit is provided for relay 301, extending from battery through the winding and contact 6 of relay 301, contact 2 of relay 302 to ground on conductor 110. At the end of the digit, relay 302 releases in turn releasing relay 301.

The third and fourth digits are registered on registers 330 and 340 in substantially the same manner, except that relay 301, which is operated during the reception of the fourth digit by register 340, closes at its contact 7 a substitute for normal contact 341 which opens as soon as register 340 steps off normal.

When relay 302 releases at the end of the fourth digit, a start circuit is closed for the marker connector which may be traced from ground on off-normal contact 343, contact 9 of relay 300, contact 3 of relay 302, conductor 361 to the winding of the trunk preference relay 402.

There is a trunk preference relay for each trunk served by the marker connector of Figs. 4 to 15. These relays are arranged in a plurality of groups, the relays of each group being arranged in a preference chain to prevent interference between trunks if more than one signal for connection with a marker at the same time. The trunk of Figs. 1 to 3 has been shown as an intermediate trunk in the first group 400. Therefore, the circuit of relay 402 may be extended to battery only if the preference relays of trunks with the earlier preference relays are normal. If any of these trunks have closed their start circuits, the relay with the earliest preference will operate and the remaining relays wait their turn.

Assuming that no other trunk preference relay is operated, the circuit of relay 402 will be extended to battery over contacts 6 of intermediate preference relays and relay 401 associated with the first trunk 380, of the group. Relay 402 operates, opening at contact 6 the battery supply of preference relays lower in the chain such as relay 403 associated with the last trunk 390. At contacts 7 and 9, relay 402 closes a locking circuit for itself from battery over contact 7, winding and contact 9 of relay 402, conductor 360, contact 9 of relay 300 to ground at off-normal contact 343. Relay 402, therefore, remains operated independent of the preference chain and independent of relay 302. At contact 8, relay 402 connects ground to conductor 110 to prevent release of the registers while the marker is connected with the trunk.

At contact 5, relay 402 closes a circuit from battery to ground through the winding of the group relay 405. Relay 405 at contact 2 grounds conductor 499 to start a timing function which will be described hereinafter. At contact 1, relay 405 closes a group start circuit which may be traced from battery, contact 1 of relay 405, lower normal contact of jack 406, contact 2 of relay 404, conductor 430, normal contact of relay 1100, conductor 1120 to the winding of group preference relay 900. There is a group preference relay for each group of trunks served by the connector of Figs. 4 to 14 and, as in the case of the trunk preference relays, they are arranged in a preference chain to prevent conflict between groups which may have trunks seeking a marker simultaneously. Therefore, the circuit of relay 900 extends over contacts 5 of intermediate relays including relay 910 individual to intermediate group 410 and of relay 920 individual to the last group 420. If none of these relays is operated, the circuit of relay 900 is completed to ground and the relay operates. Relay 900, in operating, locks to ground over its contact 6. At contact 1 relay 900 opens the operating circuit of relay 704, the function of which will be described hereinafter. At contact 2, relay 900 closes a circuit for the group multicontact relay 500, which circuit may be traced from ground over contact 2 of relay 900, conductor 901, contact of relay 1101, conductor 1121, winding of multi-contact relay 500, conductor 501, back contact of relay 805 to battery over conductor 430 as previously traced. Relay 500 operates in this circuit, locking over contact 39 to conductor 430 independent of relay 805. At contact 4 relay 500 connects ground to conductor 710, operating relay 705 for a purpose to be described later.

Relay 500, when operated, initiates the selection of an idle marker. To this end it extends battery from conductor 430 over its contact 38, conductor 502, contact 1 of relay 800, conductor 806, back contact of relay 1201, to conductor 1220 and the upper armature of relay 961. The marker associated with relays 960 and 961 is first choice in this connector. Therefore, the start circuit traced to the armature of relay 961 extends over the back contact of relay 961 to the winding of relay 960 and thence to ground through contacts of relays corresponding to relay 960 in the other connectors.

The markers serve other trunks which appear in other connectors, different markers being first choice in different connectors. Therefore, the contacts of the relays like relay 960 associated with the same marker are connected in a chain arrangement similar to the chain arrangement of the individual trunk preference relays. Such arrangements are well known in the art and no attempt has been made to disclose the details thereof.

As soon as relay 960 operates, it locks in a circuit from battery on conductor 502, contact of relay 1200, conductor 1227, contact 3 of relay 960, contact 1 of relay 961, winding and contact 5 of relay 960 to ground at contact 5. It also closes a circuit from ground over its contact 2, conductor 962, back contact of relay 1200, conductor 1221 to the winding of multicontact relay 602 and battery. Relay 602, at contact 4 grounds conductor 710 to hold relay 705 operated. With relays 500 and 602 operated, a plurality of circuits are established connecting the group of trunks with marker 250. When relay 602 operates, it connects ground from the back contact of relay 805, conductor 603, contact 41 of relay 602, conductor 1222, back contact of relay 1201, conductor 964 to the upper winding of relay 961 in shunt of battery. Later the marker connects ground to conductor 963 leading to the upper windings of all of the connector relays associated with marker 250 like relay 961, operating all of these relays except relay 961, which is shunted as above described in the connector over which the marker is serving a register, thereby indicating that the marker is busy to the other connectors. In addition the marker connects ground to conductor 610, over contact 10 of relay 602, conductor 611, contact 10 of relay 500, conductor 505, contact 3 of relay 403 and contact 4 of relay 402 to the winding of relay 402 to hold that relay operated under the control of the marker.

When the marker is ready to receive the called line designation it connects battery to conductor 604, which extends over contact 11 of relay 602, conductor 605, contact 11 of relay 500, conductor 503, contact 11 of relay 403 and the intermediate relays, contact 10 of relay 402, conductor 362 to ground through the windings of relays 303 and 201 in the associated trunk circuit.

With relay 303 operated, ground is connected to the conductors individual to the registers of Fig. 3 which are connected to the group conductors and over the contacts of relays 500 and 602 to the marker, where the marker registers are operated in accordance with the registration setup in the trunk and the marker proceeds to control the extension of the trunk to the wanted line. The functions of the trunk under the control of the marker are described in applicant's previously identified copending application.

While the marker is operating it connects ground to conductor 608, completing a circuit over contact 9 of relay 602, conductor 609, contact 9 of relay 500, conductor 504, lower winding of relay 404 and battery. Relay 404 when operated disconnects battery supplied by relay 405 from conductor 430, opening the operating circuit of relay 900. However, prior to operating relay 404, the marker connects battery to conductor 612 closing a substitute holding circuit for relay 900 which becomes effective when relay 404 operates and may be traced from conductor 612 over contact 36 of relay 602, conductor 807, contact 4 of relay 802, conductor 506, contact 37 of relay 500, conductor 432, contact 3 of relay 404 to conductor 430 and thence to relay 900 as previously traced. The purpose of relay 404 will be described hereinafter.

When the marker has completed its functions, it grounds conductor 606, completing a circuit over contact 35 of relay 602, conductor 607, contact 36 of relay 500, conductor 363, lowermost contact of relay 303, conductor 364, winding of relay 109 and battery. Relay 109 establishes the talking circuit through the trunk and locks over its contact 8 to ground at contact 2 of relay 107 thereby signaling the marker that the trunk has been closed. It also closes a circuit from ground at its contact 15, conductor 113, over the off-normal contacts 313, 323 and 333 to battery through the left winding of relay 300.

The marker responds to the trunk closure signal by removing battery from conductor 604, permitting relays 303 and 201 to release. With relay 303 released and relay 300 operated, relay 304 is operated and circuits are closed for release magnets 315, 325, 335 and 345 to restore the registers to normal, after which relays 300 and 304 release.

The release of relay 201 connects the trunk conductors through to the switches 252, permitting the called line to be signaled and conversation to take place following response by the called line.

The operation of the register release relay 300, opens the start and holding circuits for relay 402 and that relay releases, restoring the trunk perference chain to normal and releasing relays 405, 500, 900, 960 and 602.

While relay 402 was operated, one or more relays earlier in the trunk preference chain may have operated, and be in condition to connect with a marker. However, in order to insure a more equitable distribution of markers to trunks, particularly during periods of heavy load, means is provided to prevent the connection of a second trunk in one group to a marker until a marker has been connected to one trunk in each group having calls waiting. For this purpose, group lock-out relay 404 was operated as above described. Relay 404 opens the operating circuit of group preference relay 900 and closes a holding circuit for relay 900 under the control of the marker, extending from conductor 430, contact 3 of relay 404, conductor 432, contact 37 of relay 500, conductor 506, contact 4 of relay 802, conductor 807, contact 36 of relay 602, to battery over conductor 612. The release of the multicontact relays 500 and 602 opens the circuit for relay 404 as well as the holding circuit for relay 900 and, if no other trunk preference relays are operated, relay 404 and 900 release.

If another trunk preference relay is operated, for example, relay 401, relay 405 is held operated by battery over contact 5 of relay 401. If a trunk in another group is waiting for connection to a marker, the associated group preference relay, for example, relay 920, will be operated, holding open the operating circuit for relay 704. Therefore, although the operating circuit for relay 404 has been opened, that relay will be held locked in a circuit from battery over contact 1 of relay 405, lower normal contact of jack 406, contact 4 and upper winding of relay 404, conductor 431 to ground at contact 3 of relay 704. When one trunk in the group associated with relay 920 has been connected with a marker, relay 920 is released and the operating circuit for relay 704 reclosed to open the locking circuit for relay 404 thereby restoring the operating circuit for group relay 900. If calls are waiting in a plurality of groups, the relay corresponding to relay 404 in each group is locked until all waiting groups have had one trunk served, at which time all of the group preference relays will have been released and relay 704 operated to release all of the group lock-out relays. It will be noted that relay 404 is slow to release, to prevent its release during the interval between the release of one group preference relay and the operation of another if the waiting group is in a less preferred position in the group chain.

If the marker 250 encounters trouble so that the associated timing circuit completes its operation, ground is connected to trouble release conductor 613, thereby completing a circuit over contact 38 of relay 602, conductor 614, contact 1 of relay 803, winding of relay 802 and battery. Relay 802 closes a locking circuit for itself through the winding of relay 803, contact 2 of relay 802, conductor 813 to ground at contact 6 of relay 500. Relay 803 does not operate at this time being shunted by the operating circuit for relay 802. With relay 802 operated the circuit over which battery was supplied from the marker to hold relay 900 is removed, but conductor 506 is extended over contact 3 of relay 802 to battery at contact 1 of relay 804, preventing the release of relay 900. At contact 1, relay 802 closes an obvious circuit for relay 805 which operates, removing the shunt from the battery supplied to relay 961 thereby permitting relay 961 to operate and mark the marker busy in this channel. With relay 961 operated, relay 960 releases, in turn releasing relay 602. If any other marker is idle, relay 961 locks in a circuit from battery through its lower winding and contact 3, contact 4 of the relay like 961 associated with an idle marker, conductor 965, back contact of relay 1102, conductor 1123 to ground at contact 5 of relay 500, to cause the selection of a different marker on a second trial.

The release of relay 602 opens the operating circuit for relay 802 and permits relay 803 to operate in the locking circuit previously traced. Since relay 900 is held operated, the operation of relay 961 transfers the marker start circuit to the next preference relay associated with an idle marker and brings about the connection of that marker with the trunk to make a second trial. If there are no idle markers, relay 961 cannot lock and the same marker may be selected for the second trial. Relay 803, operated, at contact 3 connects ground to conductor 603 to shunt the busy relay corresponding to relay 961 belonging to the new marker. At contact 4, relay 803 connects ground over conductor 809, contact 39 of the multi-contact relay of the newly selected marker and conductor 615 leading thereto, informing that marker that it is making a second trial. The second trial marker grounds conductor 613, completing a circuit over contact 40 of the corresponding multicontact relay, conductor 617 to the lower winding of relay 804 and battery. With relay 804 operated, conductors 506 and 807, which were disconnected by the operation of relay 802 are again connected together to reclose the holding circuit for relay 900.

If the second marker completes the connection, it disconnects battery from conductor 612, releasing relays 900, 500, 602 and in turn relays 802, 803 and 805. As soon as relay 900 releases, a trunk group which is waiting is in position to operate its multicontact relay, but cannot do so until relay 805 releases, in order to insure the release of the second trial relays.

If the second trial marker also encounters trouble and grounds its conductor 613, thereby grounding conductor 614 in the connector, a circuit would be completed over contact 2 of relay 803, upper winding of relay 804 to battery and in parallel with the winding of relay 804 over conductor 810, contact 40 of relay 500, conductor 507, contact 1 of relay 404, contact 1 of relay 403, and the intermediate trunk preference relays, contact 2 of relay 402, conductor 367 to the right winding of relay 300 and battery to bring about the release of the trunk registers and to transmit an overflow signal over the incoming trunk, as described in applicant's above-identified copending application.

If conductor 809 or 810 should become falsely grounded in the connector multiple, trunk register circuits would repeatedly be dismissed prematurely or be handled on a second trial basis by the marker. Therefore, these conductors are tested during the time that the connector circuit is idle. As above mentioned, with either a trunk register multicontact relay, like relay 500, or a marker multicontact relay like relay 602 operated, relay 705 is held operated. When none of the multicontact relays is operated, relay 705 is released and a false ground on conductor 809 would complete a circuit over contact 5 of relay 803, contact 1 of relay 705, lower winding of relay 700 and battery. Similarly, a false ground on conductor 810 would complete a circuit over contact 3 of relay 705, contact 2 and upper winding of relay 700 to battery. In either case relay 700 locks to ground over conductor 711, sets up an indication over conductor 713 of the identity of the connector circuit which is in trouble and sounds an alarm over conductor 712. Relay 700 also operates if ground appears on conductor 433 or 434 which might indicate a cross-connection within the trunk preference relay chain capable of affecting more than one trunk circuit.

As mentioned above, relay 405 is operated as long as one of the trunk preference relays is operated and relay 704 is released whenever one of the group preference relays is operated. With relay 405 operated or relay 704 released ground is connected to conductor 409 and over contact 1 of relay 703 to conductor 709 extending to the interrupter 720. Conductor 709 is also grounded over contact 4 of relay 703, conductor 508 and contact 2 of relay 500 or other trunk group multicontact relay. With conductor 709 grounded, relay 706 operates over the left contact of interrupter 720 and locks to conductor 709. A measured interval later relay 702 operates over the right contacts of interrupter 720 and relay 706 and extends its operating ground to the upper winding of relay 701 which operates, locks itself and relay 702 to conductor 709 and locks independent of relay 702, over its contact 5 and conductor 716 to a key at the trouble indicator frame. When relay 602 or other marker multicontact relay operates, ground is connected over contact 2 of that relay to conductor 618, operating relay 703 and disconnecting conductor 709 from conductors 409 and 508, releasing relay 706 if operated. Ground on conductor 618 also extends to interrupter 721, operating relay 707 when the left contact is closed. Relay 707 locks to conductor 618 and when after a measured interval the right contact of interrupter 721 closes, completes a circuit through the upper winding of relay 702 which locks to conductor 618. The operation of the connector is therefore divided into two timing intervals, shortening the time that must elapse before an alarm is sounded. Relay 702 when operated connects ground to conductor 712 to start the alarm circuit and relays 701, 702 and 703 all ground conductor 713 to identify the connector.

Since the operation of relay 701 indicates a failure to seize a marker it is used to start the connection of the associated connector with the auxiliary preference relays of Figs. 10, 13 and 14. With relay 701 operated, a circuit is closed from battery through resistance 708, contact 1 of relay 704 or contact 3 of relay 405, conductor 1020, contact 1 of relay 701, conductor 714 to the winding of the connector preference relay 1000 and ground. Each of the connectors on the same frame has such a preference relay and they are connected in a chain arrangement similar to that of the trunk preference relays so that only one connector may use the emergency preference relays at a time.

Relay 1000 has the preferred position for operation and operates whenever its circuit is closed and locks over its contact 1, conductor 1020, contact 1 of relay 704 or contact 3 of relay 405 to battery through resistance 708. At contact 3 relay 1000 connects ground over the upper normal contact of jack 1011 and contacts 2 of the other connector preference relays, such as relays 1002 and 1001, associated with connectors 1500 and 1501, contact 3 of relay 1000 to conductor 1021 to indicate that the preference relays are in use. At contact 5 it opens the operating circuit for the connector preference relays having less favored positions in the preference chain. At contact 11 it closes a circuit from ground over the lower normal contact of jack 1011, contact 3 of relay 1010, contacts 10 of relays 1002, 1001, etc., contact 11 of relay 1000, conductor 1022 to battery through the windings of disconnect relays 1100, 1101, 1102, 1200 and 1201 in parallel. These relays operate, disconnecting the connector circuit from the regular group preference relays and the regular marker preference relays, opening the circuits for the trunk group multicontact relays. When the operated multicontact relay releases, it opens the circuit of relay 705 and that relay releases.

As soon as relay 705 closes its contact 2, a circuit is closed from battery through windings of the cut-in relays 1110, 1111, 1112, 1210, 1211 and 1212 in parallel, front contacts of relays 1201, 1200, 1102, 1101 and 1100 in series, conductor 1124, contact 2 of relay 705, conductor 715, contact 9 of relay 1000, contacts 10 of relays 1001, 1002, etc., contact 3 of relay 1010, lower normal contact of jack 1011 to ground. Relays 1110, 1111, 1112, 1210, 1211 and 1212 connect the connector circuit with the auxiliary preference relays.

The auxiliary preference relays consist of a duplicate set of trunk group preference relays, 1300 to 1302 and a duplicate set of marker preference and connector busy relays 1400, 1410, 1420 and 1401, 1411 and 1421. In addition, there is provided two sets of preference advance relays 1310 to 1312 and 1402, 1412 and 1422, arranged to change the order of preference on the trunk group preference relays and the marker preference relays on each call and on the marker preference relays whenever a second trial is made. Relay 1000 in operating at contacts 12 and 4 grounds conductors 1023 and 1024 to provide locking ground for these preference advance relays.

Relays 1110 to 1112 and 1210 to 1212 each connect ground to conductor 717 providing a locking circuit for the disconnect relays over the upper front contact of relay 1100 and an operating circuit for relay 1010 over the contact 8 of relay 1212 and conductor 1223. Relay 1010 opens the operating circuits for the disconnect and cut-in relays, connects ground to conductors 1023 and 1024 and closes a locking circuit for the cut-in relays which extends from the winding of these relays over contact 5 of relay 1212, conductor 1224, contact 7 of relay 1000, contact 8 of relays 1001, 1002, etc., contact 4 of relay 1010 to ground over the lower normal contact of jack 1011. The operation of the cut-in relays of this connector is therefore maintained as long as relay 405 remains operated.

With relay 1110 operated, battery on conductor 430 is extended over conductor 1125 to the winding of relay 1300 and ground at a back contact of relay 1322. Relay 1300 operates in this circuit and locks to ground over its contact 5. At contact 1 it opens the normally closed chain circuit to relay 704, causing that relay to release and connect battery through resistance 708 to conductor 1020 to hold relay 1000 operated. At contact 2, relay 1300 closes a circuit from ground over contacts 1 of relays 1302, 1301, etc., contact 2 of relay 1300, conductor 1323, contact 2 of relay 1321 to the winding of relay 1320 and battery. Relay 1321 closes a circuit from ground on conductor 1323, over contact 2 of relay 1320 to the winding of relay 1321 and battery. Relay 1321 locks over its contact 3 to conductor 1323, opening at contact 2 the operating circuit for relay 1320 which releases. With relay 1320 released a circuit is closed from ground over contact 1 of relay 1321, contact 1 of relay 1320 to the winding of relay 1322 and battery, operating relay 1322 to remove ground from the windings of relays 1301, 1302, etc. to prevent their later operation. The operation of relays 1320 and 1321, followed by the release of relay 1320 allows time enough for relay 1300 and any other trunk group relays which may be operated to establish their locking circuits before the operating circuits are opened.

When relay 1322 operates, assuming that none of the preference advance relays 1310, etc., are operated, and only group preference relay 1300 is operated, a circuit is closed from ground over the front contact of relay 1322, contacts 4 of relays 1310, 1311, 1312, etc., contact 4 of relay 1300, conductor 1330, front contact of relay 1111 to conductor 1121 and thence to battery through the trunk multicontact relay 500 as previously traced. Relay 500 operates and locks as before.

Relay 500 in operating operates relay 705 as before. It also connects battery to conductor 502 and thence to conductor 806 as before, but conductor 806 is now extended over contact 1 of relay 1212, conductor 1225, contact 3 of relay 1431 to the winding of relay 1430 and ground. Relay 1430 operates, closing at contact 1 a circuit from ground, contact 1 of relay 1434, over contact 3 of relay 1412 and contact 1 of relay 1422 and similar preference advance relays to battery through the winding of relay 1402 and battery. Relay 1402 operates in this circuit, locking over its contact 6 and contact 7 of relay 1412, to ground on conductor 1024. At its contact 2, relay 1402 connects the winding of relay 1412 to ground over the contacts 1 of relays 1434 and 1430, causing relay 1412 to operate and lock over its contact 6 and contact 7 of the next preference advance relay to ground on conductor 1024. With relay 1412 operated the locking circuit for relay 1402 is opened at contact 7 of relay 1412 but prior thereto is closed over contact 8 of relay 1412, contacts 2 of relays 1434 and 1430 to the winding of relay 1432 and ground, operating relay 1432.

Relay 1430 in operating also closes a circuit from ground over its contact 6, conductor 1440, contact 3 of relay 1311, contact 1 of relay 1312 and similar contacts of intermediate preference advance relays to the winding of relay 1310 and battery. Relay 1310 operates, locking over its contact 8, contact 9 of relay 1311 to ground on conductor 1023. Relay 1310 closes a circuit from battery through the winding of the next preference advance relay 1311, contact 2 of relay 1301 to ground on conductor 1440. Relay 1311 also locks over its contact 8 and contact 9 of the next preference advance relay to ground on conductor 1023. At contact 9 relay 1311 opens the locking circuit of relay 1301, but before doing so closes a substitute holding circuit over contact 10, conductor 1332, contact 5 of relay 1430 to ground through the winding of relay 1433, operating relay 1433.

With both relays 1432 and 1433 operated, the battery connected to conductor 1225 as previously traced is extended over the contacts of relays 1433 and 1432 in series to the winding of relay 1431 and ground. Relay 1431 operates, locking over its contact 4 to conductor 1225 and opens the circuit of relay 1430, which releases. Relay 1431 connects ground over its contact 1 and contact 3 of relay 1430 to hold relay 1402 operated before relay 1430 opens contact 2 to disconnect relay 1432. Similarly, relay 1431 connects ground over its contact 5 and contact 4 of relay 1430 to hold relay 1310 operated before relay 1433 is disconnected.

At contact 2, relay 1431 extends battery on conductor 1225 over contact 5 of relay 1402, contact 4 of relay 1422, contact 1 of relay 1401 to the winding of marker preference relay 1400 and thence to ground over a chain circuit associated with this marker through the other connectors. Relay 1400 operates, in turn operating multicontact relay 602. From this point on, the connection is established in the same manner as when the connector relays are controlled by the regular preference relays.

On every call, when the marker releases, it disconnects battery from conductor 612, releasing relay 1300 which in turn releases relay 500, removing battery from conductor 1225, whereupon relay 1431 releases. Since relay 1000 is held operated as long as calls are waiting for attention in this connector, ground remains connected to conductors 1023 and 1024, and preference advance relays 1311 and 1412 remain operated, but the release of relay 1431 permits relays 1310 and 1402 to release. When battery is reconnected to conductor 1225 in response to another call, relay 1430 is reoperated. With relay 1402 released the operating circuit for the marker preference advance relays is extended to the relay following relay 1412 in the chain which relay locks to conductor 1024 and connects relay 1412 to relay 1432. Similarly the next relay in the group preference advance chain is operated and locked and connects relay 1311 to relay 1433. With relays 1412 and the next relay operated, the marker preference circuit extends from conductor 1225, contact 2 of relay 1431, contact 4 of relay 1402, contact 5 of relay 1412 to the armature of relay 1411, thus giving the associated marker the preference. In the group preference advance relays with relay 1310 released and relays 1311 and the next preference advance relay operated, the preference circuit closed by relay 1322 extends over contact 4 of relay 1310, contact 5 of relay 1311 to the inner upper armature of relay 1301 giving the second group preference. In this manner the preference is advanced after each call.

It will be remembered that in the case of trouble on a first trial by the marker, relay 802 was operated by the marker. This relay, at contact 5 connects ground to conductor 808. If the auxiliary preference relays are in use, with preference advance relays 1402 and 1412 held operated as above described, this ground is extended over contact 2 of relay 1212 to conductor 1226 and over contact 2 of relay 1435 to the winding of relay 1434 and battery. Relay 1434 operates, connecting battery through the winding of relay 1435 over contact 3 of relay 1434 to conductor 1226. Relay 1435 locks over its contact 1 directly to conductor 1226 and then opens the operating circuit for relay 1434. The operation of relay 1434 opens the locking circuit of the first operated preference advance relay, namely, relay 1402, but relay 1412 is held locked over conductor 1024 under the control of relay 1000. The release of relay 1402 opens the circuit of the marker preference relay 1400, in the above traced operation, relay 1400 in turn releasing the multicontact relay 602. With relay 1402 released the preference circuit is advanced to the armature of relay 1411 and the connection to the same or a different marker is completed as described above.

When the transfer is made from the regular group and marker preference relays to the auxiliary preference relays, ground is removed from conductor 709, releasing relay 706 and 702, but relay 701 is held operated at the trouble indicator frame until the maintenance man operates the key to release it in response to the alarm. However, if, when relay 701 is thus released, there are other trunks waiting for connection to a marker, so that a trunk group relay like relay 405 is operated, or relay 704 is released because of the operation of an auxiliary group preference relay, the connector preference relay 1000 will be held operated over the circuit previously traced. When all trunk group relays like relay 405 have released and relay 704 operates following the release of the auxiliary group preference relays, relay 1000 also releases. The disconnect relays 1100, etc. and cut-in relays 1110 are held operated under the control of relay 705 as long as any of the multicontact relays are operated. When all of the cut-in relays have released, the disconnect relays can release. Relay 1010 also releases, disconnecting ground from conductors 1023 and 1024. If no other connector is waiting to use the emergency preference relays, the preference advance relays release. However, if another of the connector preference relays is operated or operates immediately following the release of relay 1000, ground is held on conductors 1023 and 1024, one preference advance relay is held operated in each set and the preference continues to advance from the point last served.

If a trouble should develop which prevents the connector from serving a particular trunk group, for example, the group, associated with the preference relays of Fig. 4, a plug 407 will be inserted in the jack 406. The insertion of the plug opens the circuit for the group preference relay 900 and also the false ground checking circuit leading to relay 700. Ground is connected from the sleeve of jack 406 over the sleeve and ring contacts of plug 407, ring contact of jack 406, to interrupter 435. At each closure of the interrupter contact, relay 408 operates, connecting ground over the upper alternate contact of jack 406 to conductor 436 and over the lower alternate contact of jack 406 to conductor 505.

When a trunk in this group, for example, the trunk of Figs. 1 to 3, is seized and operates its trunk preference relay 402, that relay is ineffective to operate the trunk group preference relay. At the next subsequent operation of relay 408, ground on conductor 505 holds relay 402 operated, while ground on conductor 436 is extended to conductor 367, operating relay 300 to bring about release of the registers and the transmission of an overflow signal to the originating office. The interrupter is timed to permit the trunk registers to complete their release before the release of relay 408 removes ground from conductor 505 and releases relay 402.

In periods of heavy traffic, connectors might be delayed in seizing markers, even though markers are available, since their marker preference relays may be slower operating than the others and therefore they might be repeatedly shut out because some other connector seizes an available marker more quickly. In order to equalize these delays between the various connectors, a gate arrangement is provided. This arrangement comprises the relays 800 and 801. When the marker multicontact relay such as relay 602 operates to complete the connection between the marker and the trunk, a circuit is closed from ground at contact 3 of relay 602, conductor 619, upper winding of relay 800, contact 4 of relay 701 to battery. This circuit is carried over the contact of relay 701 to cancel the gating function when the emergency preference relays are in use. Relay 800 closes a circuit from battery through the winding of relay 801, contact 2 of relay 800, conductor 811 to ground. When the multicontact relay releases, the circuit for relay 800 is opened and that relay releases, provided no other connector is waiting. If another connector is waiting for a marker, that connector will have operated its trunk group multicontact relay like relay 500 which will have completed a circuit corresponding to one which may be traced from ground over contact 3 of relay 500, conductor 509, back contact of relay 801, contact 5 of relay 800 to conductor 812. This conductor is connected in multiple to all connectors and therefore ground will be present on conductor 812 in the connector shown. A circuit is therefore closed from battery through the lower winding of relay 800, front contact of relay 801, contact 4 of relay 800 to ground on conductor 812 to prevent the release of relay 800 following the release of relay 602. As each waiting connector establishes one connection to a marker, the relay corresponding to relay 800 is operated in that connector and, when all waiting connectors have been served once, ground will be removed from conductor 812, allowing all relays 800 to release and another call to be extended in each waiting connector.

Some of the trunks served by these connectors are reserved for use in completing special calls such as number checking or no test calls and such trunks are identified by ground connected to contact 12 of the associated trunk preference relay as shown by relay 403. Since such calls require considerable extra equipment in the marker, only a limited number of such markers are so equipped and means is provided for insuring that such a marker is used when a call comes in over a special trunk.

When trunk preference relay 403 operates in response to a call over the associated trunk, it operates group relay 405 and the latter relay operates the group preference relay 900 as described for relay 402. Relay 900 at contact 4 extends its operating circuit to the winding of relay 930, completing a circuit which extends from relay 930, over contact 7 of relay 900, conductor 902, back contact of relay 1102, conductor 1122, contact 12 of relay 403 to the ground which identifies the calling trunk as one requiring a special marker. Relay 930 operates, connecting ground to the upper windings of relays 941, 951 and any other relays in this connector associated with ordinary markers to make them appear busy and to advance the start circuit to a marker preference relay associated with a special marker.

In addition, since the special markers may also serve ordinary calls, relay 930 grounds conductor 963 which is extended by the marker multicontact relay to the marker to prepare it for handling a special call. The marker also receives a signal from the incoming trunk to identify the precise type of special call to be handled.

If the auxiliary preference relays are used, when relay 403 has operated to indicate a call over a special trunk, the auxiliary group preference relay, such as relay 1300 closes a circuit for relay 931 which may be traced from battery through the winding of relay 931, conductor 965, contacts 6 of preference advance relays 1310, etc., contact 6 of relay 1300, conductor 1331, front contact of relay 1112, conductor 1122, contact 2 of relay 403 to ground. Relay 931 connects ground to conductors 966, 967, etc., to operate the auxiliary marker busy relays 1411, 1421, etc., which are individual to ordinary markers in the same way that relay 930 operates relays 941, 951, etc.

What is claimed is:

1. In a telephone system, a plurality of groups and subgroups of trunks, a plurality of markers, a plurality of connectors, each connector individual to a group of trunks, a set of trunk subgroup preference relays individual to each connector, a set of marker preference relays individual to each connector, means to operate one relay in each of said sets of preference relays to identify a preferred trunk subgroup and a preferred marker in one connector and means under the control of said operated preference relays for operating said connector to connect said preferred trunk subgroup to said preferred marker.

2. In a telephone system, a plurality of groups and subgroups of trunks, a plurality of markers, a plurality of connectors, each connector individual to a group of trunks, a set of trunk subgroup preference relays individual to each connector, a set of marker preference relays individual to each connector, means to operate one relay in each of said sets of preference relays to identify a preferred trunk subgroup and a preferred marker in one connector, means under the control of said operated preference relays for operating said connector to connect said preferred trunk subgroup to said preferred marker, and means in each trunk to connect said individual trunk with said preferred marker.

3. In a telephone system, a plurality of groups and subgroups of trunks, a plurality of markers, a plurality of connectors, each connector individual to a group of trunks, a set of trunk preference relays, a set of trunk subgroup preference relays individual to each connector, a set of marker preference relays individual to each connector, means under the control of a calling trunk for operating a relay in each of said sets of preference relays to identify a preferred trunk subgroup and a preferred marker in one connector and means under the control of said operated preference relays for operating said connector to connect said preferred trunk subgroup to said preferred marker.

4. In a telephone system, a plurality of groups and subgroups of trunks, a plurality of markers, a plurality of connectors, each connector individual to a group of trunks, a set of trunk preference relays, a set of trunk subgroup preference relays individual to each connector, a set of marker preference relays individual to each connector, means under the control of a calling trunk for operating a relay in each of said sets of preference relays to identify a preferred trunk subgroup and a preferred marker in one connector, means under the control of said operated preference relays for operating said connector to connect said preferred trunk subgroup to said preferred marker, and means in said calling trunk for connecting said trunk with said preferred marker.

5. In a telephone system, a plurality of groups and subgroups of trunks, a plurality of markers, each marker having a set of registers, a plurality of connectors, each connector individual to a group of trunks, a set of trunk preference relays, a set of trunk subgroup preference relays individual to each connector, a set of marker preference relays individual to each connector, means under the control of a calling trunk for operating a relay in each of said sets of preference relays to identify a preferred trunk subgroup and a preferred marker in one connector, means under the control of said operated preference relays for operating said connector to connect said preferred trunk subgroup to said preferred marker, and means in said calling trunk for controlling the transmission of a designation to said marker registers.

6. In a telephone system, a plurality of groups and subgroups of trunks, each trunk having a set of registers, a plurality of markers, each marker having a set of registers, a plurality of connectors, each connector individual to a group of trunks, a set of trunk preference relays, a set of trunk subgroup preference relays individual to each connector, a set of marker preference relays individual to each connector, means under the control of a calling trunk for operating a relay in each of said sets of preference relays to identify a preferred trunk subgroup and a preferred marker in one connector, means under the control of said operated preference relays for operating said connector to connect said preferred trunk subgroup to said preferred marker, and means in said calling trunk for transmitting a designation set up on the trunk registers to said marker registers.

7. In a telephone system, a plurality of groups and subgroups of trunks, each trunk having a set of registers, a plurality of markers, each marker having a set of registers, a plurality of connectors, each connector individual to a group of trunks, a set of trunk preference relays, a set of trunk subgroup preference relays individual to each connector, a set of marker preference relays individual to each connector, means under the control of a calling trunk responsive to the setting of said trunk registers for operating a relay in each of said sets of preference relays to identify a preferred trunk subgroup and a preferred marker in one connector, means under the control of said operated preference relays for operating said connector to connect said preferred trunk subgroup to said preferred marker, and means in said calling trunk for transmitting a designation set up on the trunk registers to said marker registers.

8. In a telephone system, a plurality of groups and subgroups of trunks, a plurality of markers, a plurality of connectors, each connector individual to a group of trunks, a set of trunk subgroup preference relays individual to each connector, a set of marker preference relays individual to each connector, means normally under the control of said preference relays for identifying a preferred trunk subgroup and a preferred marker and operating the associated connector to connect said preferred trunk group with said preferred marker, an auxiliary set of trunk subgroup preference relays common to said connectors, an auxiliary set of marker preference relays common to said connectors and means to disconnect a connector from its sets of individual preference relays and connect it to said sets of auxiliary preference relays.

9. In a telephone system, a plurality of groups and subgroups of trunks, a plurality of markers, a plurality of connectors, each connector individual to a group of trunks, a set of trunk subgroup preference relays individual to each connector, a set of marker preference relays individual to each connector, means normally under the control of said preference relays for identifying a preferred trunk subgroup and a preferred marker and operating the associated connector to connect said preferred trunk group with said preferred marker, an auxiliary set of trunk subgroup preference relays common to said connectors, an auxiliary set of marker preference relays common to said connectors, timing means, and means under the control of said timing means to disconnect a connector from its sets of individual preference relays and connect it to said sets of auxiliary preference relays.

10. In a telephone system, a plurality of groups and subgroups of trunks, a plurality of markers, a plurality of connectors, each connector individual to a group of trunks, a set of trunk subgroup preference relays individual to each connector, a set of marker preference relays individual to each connector, means normally under the control of said preference relays for identifying a preferred trunk subgroup and a preferred marker and operating the associated connector to connect said preferred trunk group with said preferred marker, an auxiliary set of trunk subgroup preference relays common to said connectors, an auxiliary set of marker preference relays common to said connectors and means to successively substitute said sets of auxiliary preference relays for the sets of individual preference relays of a plurality of connectors.

11. In a telephone system, a plurality of groups and subgroups of trunks, a plurality of markers, a plurality of connectors, each connector individual to a group of trunks, a set of trunk subgroup preference relays individual to each connector, a set of marker preference relays individual to each connector, means normally under the control of said preference relays for identifying a preferred trunk subgroup and a preferred marker and operating the associated connector to connect said preferred trunk group with said preferred marker, an auxiliary set of trunk subgroup preference relays common to said connectors, an auxiliary set of marker preference relays common to said connectors, means to disconnect a connector from its sets of individual preference relays and connect it to said sets of auxiliary preference relays, and means associated with said auxiliary preference relays to render a different preference relay effective following each use.

12. In a telephone system, a plurality of groups and subgroups of trunks, a plurality of markers, a plurality of connectors, each connector individual to a group of trunks, a set of trunk subgroup preference relays individual to each connector, a set of marker preference relays individual to each connector, means normally under the control of said preference relays for identifying a preferred trunk subgroup and a preferred marker and operating the associated connector to connect said preferred trunk group with said preferred marker, an auxiliary set of trunk subgroup preference relays common to said connectors, an auxiliary set of marker preference relays common to said connectors, means to disconnect a connector from its sets of individual preference relays and connect it to said sets of auxiliary preference relays, means associated with said auxiliary trunk subgroup preference relays to advance the preference from one trunk subgroup preference relay to the next, means associated with said auxiliary marker preference relays to advance the preference from one marker preference relay to the next, means for simultaneously operating said trunk subgroup preference advancing means and said marker preference advancing means after each use, and means for operating said marker preference advancing means independent of said trunk subgroup preference advancing means.

13. In a telephone system, a plurality of groups and subgroups of trunks, a plurality of markers, a plurality of connectors, each connector individual to a group of trunks, a set of trunk subgroup preference relays individual to each connector, a set of marker preference relays individual to each connector, means normally under the control of said preference relays for identifying a preferred trunk subgroup and a preferred marker and operating the associated connector to connect said preferred trunk group with said preferred marker, an auxiliary set of trunk subgroup preference relays common to said connectors, an auxiliary set of marker preference relays common to said connectors, means to disconnect a connector from its sets of individual preference relays and connect it to said sets of auxiliary preference relays, means associated with said auxiliary trunk subgroup preference relays to advance the preference from one trunk subgroup preference relay to the next, means associated with said auxiliary marker preference relays to advance the preference from one marker preference relay to the next, means for simultaneously operating said trunk subgroup preference advancing means and said marker preference advancing means after each use, and means for operating said marker preference advancing means independent of said trunk subgroup preference advancing means when a preferred marker fails to operate successfully.

14. In a telephone system, a plurality of groups and subgroups of trunks, a plurality of markers, a plurality of connectors, each connector individual to a group of trunks, a set of trunk subgroup preference relays individual to each connector, a set of marker preference relays individual to each connector, means normally under the control of one of said trunks to operate one relay in each of said sets of preference relays to identify a preferred trunk subgroup and a preferred marker in one connector, means under the control of said operated preference relays for operating said connector to connect said preferred trunk subgroup to said preferred marker, and means common to the trunks of each subgroup to prevent any one of said trunks from operating the associated connector.

15. In a telephone system, a plurality of groups and subgroups of trunks, each trunk having a set of registers, a plurality of markers, each marker having a set of registers, a plurality of connectors, each connector individual to a group of trunks, a set of trunk preference relays, a set of trunk subgroup preference relays individual to each connector, a set of marker preference relays individual to each connector, means under the control of a calling trunk normally responsive to the setting of said trunk registers for operating a relay in each of said sets of preference relays to identify a preferred trunk subgroup and a preferred marker in one connector, means under the control of said operated preference relays for operating said connector to connect said preferred trunk subgroup to said preferred marker, means in said calling trunk for transmitting the designation set up on the trunk registers to said marker registers, and means common to the trunks of each subgroup to prevent any one of said trunks from operating the associated connector.

16. In a telephone system, a plurality of groups and subgroups of trunks, each trunk having a set of registers, a plurality of markers, each marker having a set of registers, a plurality of connectors, each connector individual to a group of trunks, a set of trunk preference relays, a set of trunk subgroup preference relays individual to each connector, a set of marker preference relays individual to each connector, means under the control of a calling trunk normally responsive to the setting of said trunk registers for operating a relay in each of said sets of preference relays to identify a preferred trunk subgroup and a preferred marker in one connector, means under the control of said operated preference relays for operating said connector to connect said preferred trunk subgroup to said preferred marker, means in said calling trunk for transmitting the desig- nation set up on the trunk registers to said marker registers, means common to the trunks of each subgroup to prevent any one of said trunks from operating the associated connector, and means in each trunk responsive to said connection preventing means for transmitting an overflow signal over said trunk.

17. In a telephone system, a plurality of groups and subgroups of trunks, each trunk having a set of registers, a plurality of markers, each marker having a set of registers, a plurality of connectors, each connector individual to a group of trunks, a set of trunk preference relays, a set of trunk subgroup preference relays individual to each connector, a set of marker preference relays individual to each connector, means under the control of a calling trunk normally responsive to the setting of said trunk registers for operating a relay in each of said sets of preference relays to identify a preferred trunk subgroup and a preferred marker in one connection, means under the control of said operated preference relays for operating said connector to connect said preferred trunk subgroup to said preferred marker, means in said calling trunk for transmitting the designation set up on the trunk registers to said marker registers, means common to the trunks of each subgroup to prevent any one of said trunks from operating the associated connector, means in each trunk for transmitting an overflow signal over said trunk, means in said marker for operating said signal transmitting means, and means under the control of said connection preventing means to operate said signal transmitting means.

18. In a telephone system, a plurality of groups and subgroups of trunks, each trunk having a set of registers, a plurality of markers, each marker having a set of registers, a plurality of connectors, each connector individual to a group of trunks, a set of trunk preference relays, a set of trunk subgroup preference relays individual to each connector, a set of marker preference relays individual to each connector, means under the control of a calling trunk normally responsive to the setting of said trunk registers for operating a relay in each of said sets of preference relays to identify a preferred trunk subgroup and a preferred marker in one connector, means under the control of said operated preference relays for operating said connector to connect said preferred trunk subgroup to said preferred marker, means in said calling trunk for transmitting the designation set up on the trunk registers to said marker registers, means common to the trunks of each subgroup to prevent any one of said trunks from operating the associated connector, means in each trunk for transmitting an overflow signal over said trunk, means in said marker for operating said signal transmitting means through said connector, and means under the control of said connection preventing means to operate said signal transmitting means.

AMOS E. JOEL, JR.

REFERENCES CITED

The following references are of record in the file of this patent:

UNITED STATES PATENTS

| Number | Name | Date |
|---|---|---|
| 2,364,146 | Joel | Dec. 5, 1944 |
| 2,392,089 | Hersey | Jan. 1, 1946 |
| 2,398,826 | Gillings | Apr. 23, 1946 |
| 2,416,710 | Myers | Mar. 4, 1947 |